US011113747B2

(12) United States Patent
Susser

(10) Patent No.: US 11,113,747 B2
(45) Date of Patent: Sep. 7, 2021

(54) SYSTEMS AND METHODS FOR DISTRIBUTED GROCERY FULFILLMENT AND LOGISTICS

(71) Applicant: Mike Susser, Scharnstein (AT)

(72) Inventor: Mike Susser, Scharnstein (AT)

(73) Assignee: MI.T GASTRO MANAGEMENT GMBH, Scharnstein (AT)

( * ) Notice: Subject to any disclaimer, the term of this patent is extended or adjusted under 35 U.S.C. 154(b) by 75 days.

(21) Appl. No.: 16/185,927

(22) Filed: Nov. 9, 2018

(65) Prior Publication Data

US 2019/0147522 A1    May 16, 2019

Related U.S. Application Data

(60) Provisional application No. 62/583,593, filed on Nov. 9, 2017.

(51) Int. Cl.
*G06Q 30/06* (2012.01)
*G06Q 10/08* (2012.01)
*G06F 16/903* (2019.01)

(52) U.S. Cl.
CPC ....... *G06Q 30/0633* (2013.01); *G06F 16/903* (2019.01); *G06Q 10/083* (2013.01); *G06Q 30/0641* (2013.01)

(58) Field of Classification Search
CPC ............. G06Q 30/0633; G06Q 10/083; G06Q 30/0641; G06F 16/903
USPC ............................................... 705/26.1–27.2
See application file for complete search history.

(56) References Cited

U.S. PATENT DOCUMENTS

2014/0249966 A1* 9/2014 Zaragoza ........... G06Q 30/0635
705/26.81

OTHER PUBLICATIONS

Tukkinen, Pia, and Janne Lindqvist. "Understanding motivations for using grocery shopping applications." IEEE Pervasive Computing 14, No. 4 (2015): 38-44. (Year: 2015).*

* cited by examiner

*Primary Examiner* — Anand Loharikar
(74) *Attorney, Agent, or Firm* — Meister Seelig & Fein LLP; Seth H. Ostrow, Esq.

(57) ABSTRACT

A grocery preparation and fulfillment service management system, the system comprising a purchase order server comprising processing circuitry that hosts at least one ingredients database including ingredient availability data from a plurality of fulfillment servers, a search engine configured to retrieve ingredient availability data from the at least one ingredients database, an ordering interface coupled to the search engine and accessible by a client device over a communication network, the ordering interface configured to create purchase orders based on recipes of dishes and the ingredient availability data, wherein the recipes are retrievable from public computing space and private computing space, and a fulfillment manager module in communication with the plurality of fulfillment servers via the communication network, the fulfillment manager module configured to distribute the purchase orders to the plurality of fulfillment servers and receive offers from the plurality of fulfillment servers to execute the purchase orders.

20 Claims, 27 Drawing Sheets

Fig. 27

SYSTEMS AND METHODS FOR DISTRIBUTED GROCERY FULFILLMENT AND LOGISTICS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATION

This application claims the priority of U.S. Provisional Application No. 62/583,593, entitled "SYSTEM FOR DISTRIBUTED GROCERY FULFILLMENT AND LOGISTICS," filed on Nov. 9, 2017, the disclosure of which is hereby incorporated by reference in its entirety.

BACKGROUND OF THE INVENTION

Field of the Invention

This application generally relates to computing architectures for managing information systems, and in particular, a networked distribution system for managing the fulfillment of customized grocery preparation and distribution.

Description of the Related Art

Very often chefs have trouble preparing food in the restaurant with their staff due to delivery and organization difficulties. Prep work is the key to a chef's success. Preparation of meals is often labor intensive and time consuming. Hours of prep work go into every meal. Restaurants have brigades of chefs that work as a team to prep food in advance and break down protein portions, cook sauces, and chop produce.

Providing an easier and cost-efficient system in which meals can be prepared and/or distributed to consumers is desirable and has been attempted with varying levels of success. Websites have offered kits for preparation of meals, but also at a high price. Grocery delivery services are also available on websites that allow a user to create a grocery list, order items on the list, and secure and deliver the items on the list. However, the food ingredients still require preparation (e.g., washing, cutting, mixing, etc.). Thus, there is a need for an information management system that can be used in preparing and distributing ingredients for meal recipes adequate at a commercial scale.

SUMMARY OF THE INVENTION

The present invention provides a grocery preparation and fulfillment service management system. According to one embodiment, the system comprises a purchase order server comprising processing circuitry that hosts at least one ingredients database including ingredient availability data from a plurality of fulfillment servers, a search engine configured to retrieve ingredient availability data from the at least one ingredients database, an ordering interface coupled to the search engine and accessible by a client device over a communication network, the ordering interface configured to create purchase orders based on recipes of dishes and the ingredient availability data, wherein the recipes are retrievable from public computing space and private computing space, and a fulfillment manager module in communication with the plurality of fulfillment servers via the communication network, the fulfillment manager module configured to distribute the purchase orders to the plurality of fulfillment servers and receive offers from the plurality of fulfillment servers to execute the purchase orders.

The processing circuitry may be configured to generate the private computing space. According to another embodiment, the processing circuitry may further store a private user recipe in the private computing space. The processing circuitry may also be configured to generate listings on an online marketplace in coordination with the plurality of fulfillment servers, the listings including offers to sell food ingredients based on the recipes. The fulfillment manager module may be further configured to distribute the purchase order to the plurality of fulfillment servers based on at least one of location, product availability, and ability to fulfill the purchase order.

The ordering interface may be configured to generate the purchase order including instructions for packaging, labeling, and shipping according to a user's preferences. The processing circuitry may be further configured to allow a user of the client device to create the recipes. The recipes may include data templates of food ingredients and amounts of the food ingredients for each serving. In one embodiment, the ordering interface may be configured to create the purchase order by converting a number of servings into the amounts of the food ingredients based on the data template. The recipes may include preparation instructions for each of the food ingredients.

BRIEF DESCRIPTION OF THE DRAWINGS

The invention is illustrated in the figures of the accompanying drawings which are meant to be exemplary and not limiting, in which like references are intended to refer to like or corresponding parts.

FIG. 27 illustrates an exemplary ingredient entry interface according to an embodiment of the present invention.

DETAILED DESCRIPTION OF THE INVENTION

Figure 1:
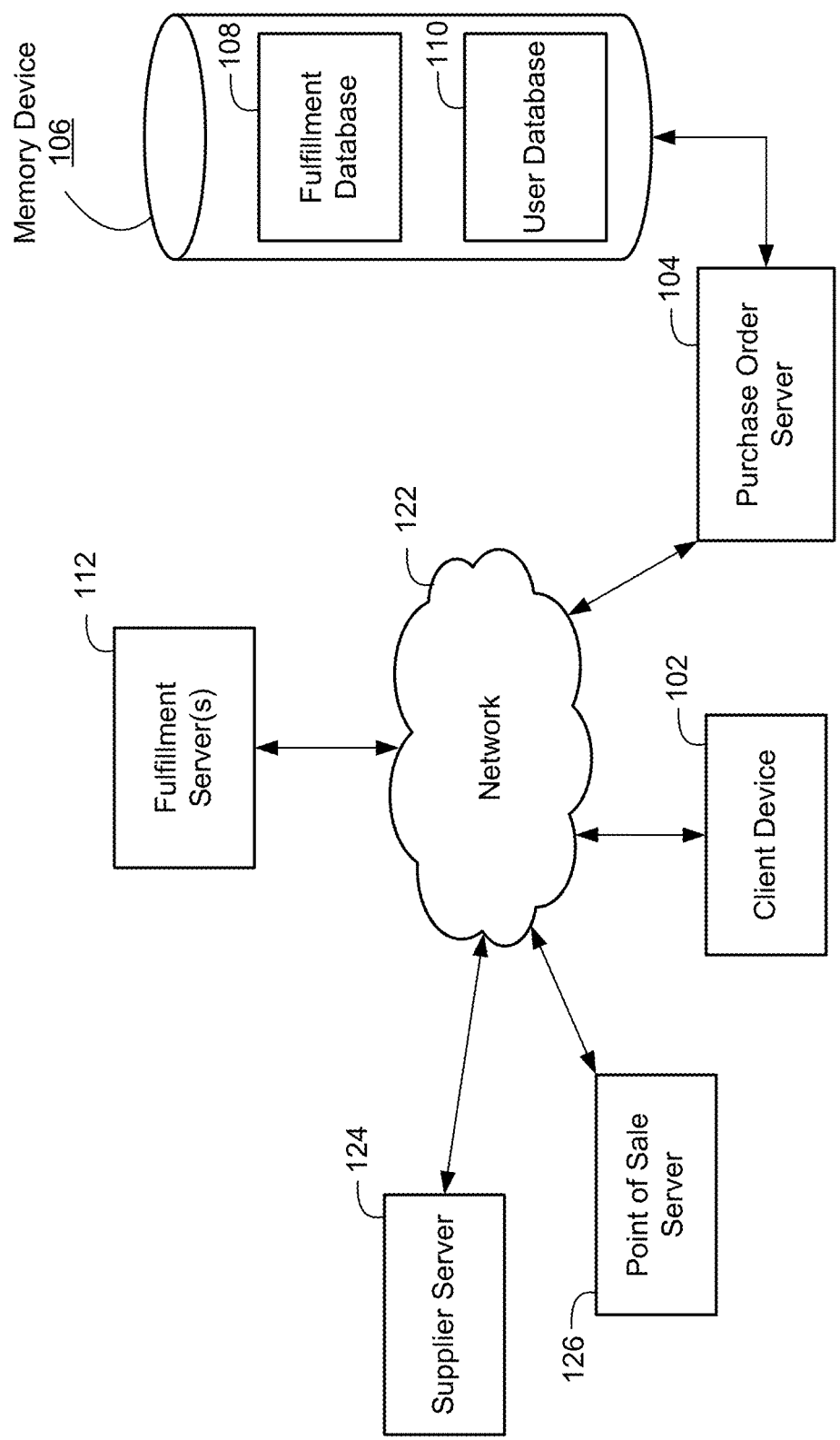
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

For the purposes of describing one or more embodiments, the present application discloses a grocery preparation and fulfillment service management system and method. The disclosed system can be used in any retail, wholesale or service enterprise where food items are prepared in-store or off-site. A consumer may procure, via the management system, grocery items associated with preparation instructions or recipes that are provided through the management system. According to certain embodiments, the system and method disclosed herein determines and communicates quantities of pre-prepared ingredients to a fulfillment center or a third-party according to private recipe instructions provided by a commercial consumer for distribution of the pre-prepared ingredients to the commercial consumer on a periodic basis. According to one embodiment, the commercial consumer may also offer private recipes and pre-prepared ingredients for purchase by retail/wholesale consumers and distribution by the fulfillment center or third-party to the retail/wholesale consumers. Examples of retail/wholesale consumers may include a retail outlet, wholesale outlet or other enterprises associated with transactions involving goods or services that occur between a customer and a retail establishment.

In another embodiment, a content distribution platform may be provided. The platform may include processing circuitry having a processor and memory. The memory may store a plurality of content items associated with at least one content library. The processor may be configured to enable access to the content items by users of the content distribution platform via a network. The content items may include at least a recipe containing content and instructions descriptive of a food item that can be prepared from a predetermined selection and amount of purchasable grocery items through the content distribution platform.

FIG. 1 illustrates a computing system according to an embodiment of the present invention. The system presented in FIG. 1 includes client device 102, purchase order server 104, fulfillment server(s) 112, network 122, supplier server 124, and point of sale server 126. Client device 102 may comprise computing devices (e.g., desktop computers, terminals, laptops, personal digital assistants (PDA), cellular phones, smartphones, tablet computers, e-book readers, or any computing device having a central processing unit and memory unit capable of connecting to a network). Client devices may also comprise a graphical user interface (GUI) or a browser application provided on a display (e.g., monitor screen, LCD or LED display, projector, etc.). A client device may also include or execute an application to communicate content, such as, for example, textual content, multimedia content, or the like. A client device may also include or execute an application to perform a variety of possible tasks, such as browsing and searching.

The purchase order server 104 may be configured to provide data that is accessible by the client device 102 via an application or web browser over network 122. For example, the purchase order server 104 may retrieve and load a web page in response to a request received from the user via the client device 102 to allow the user to interact with the website and search and/or purchase products such as, for example, food ingredients. The purchase order server 104 may generate an online shopping cart in response to receiving a user request that allows a user to input a product that the customer wishes to purchase. A user may also specify if selected products should be prepared in a certain way. For example, the user may specify cutting, seasoning, marinating, mixing, heating, cooling, and packaging of food ingredients. Products selected for purchase may be either picked up by the user or delivered to a user-specified location.

In one embodiment, purchase order server 104 may also allow a user to create private recipes in conjunction with selecting food ingredients for purchase. Each recipe may include a list of one or more food ingredients, proportions of the food ingredients, and/or amounts of the food ingredients for a given serving size (e.g., a plate). Users may create and save their recipes to their user accounts in user database 110 of memory device 106. According to another embodiment, the user may conveniently select a recipe to automatically purchase specific food ingredients in the proper proportions and amounts contained in the recipe. The user may also select the number of servings (e.g., plates) per recipe for purchase rather than the amount of individual food ingredients. Additionally, the user may further create a menu including one or more recipes to create and purchase ingredients for a full course meal, for example.

Purchase orders including the products selected for purchase by the user may be created by purchase order server 104 and forwarded to fulfillment server(s) 112. Fulfillment server(s) 112 may be associated with a fulfillment center that is selected by purchase order server 104 for preparation and distribution of given purchase orders. A fulfillment center may be a warehouse or factory that stores food ingredients and possesses equipment or staff that can prepare the food ingredients according to the user's specifications. Fulfillment server(s) 112 may be selected from a plurality of fulfillment centers in fulfillment database 108 to execute certain purchase orders. Selection of a fulfillment center for fulfilling purchase orders may be based on location (e.g., proximity to the user or a specified delivery location), product availability, and the ability to fulfill a given order. Fulfillment server(s) 112 may maintain an inventory of goods (e.g., food ingredients) and transmit inventory purchase orders to supplier server 124 for sourcing of inventory items to maintain a certain ability to fulfill incoming purchase orders. For example, the fulfillment server(s) 112 may require a certain amount of certain goods, and rely on a supply chain to procure the certain goods. In some embodiments, fulfillment server(s) 112 and supplier server 124 may be associated with a single entity or location. According to another embodiment, a particular fulfillment center may be chosen by purchase order server 104 to execute a given order based on its ability to source or acquire particular goods that are required for a given order.

According to one embodiment, in addition to purchasing pre-prepared food ingredients according to a private recipe, a user may also use purchase order server 104 to sell the pre-prepared recipe food ingredients to wholesale or retail consumers as well as in an online marketplace, for example, in a drop shipping fashion. Drop shipping may refer to where a retailer does not keep the products it sells in stock but instead purchases the products from a third party who then distributes the products directly to the customer. The user may specify, through purchase order server 104, when, where, and how much of the pre-prepared recipe food ingredients to sell. Pre-prepared recipe food ingredients may be sold in an online marketplace through a coordination between purchase order server 104 and fulfillment server(s) 112. Purchase order server 104 may create a listing in an online marketplace and forward drop shipping instructions to fulfillment server(s) 112. Additionally, sales of the pre-prepared recipe food ingredients may be coordinated with point of sale server 126. Point of sale server 126 may be on the premises of a store selected for selling the pre-prepared recipe food ingredients.

In some embodiments, the purchase order server 104 may be further configured to provide social networking type interaction among users (e.g., posting comments, message, or content to be shared with other users). In still other embodiments, the purchase order server 104 may be configured to provide access for food manufacturers and/or distributors to publish or consume content and interact with the users. As such, in at least one example, a food manufacturer or distributor may be associated with a user.

Network 122 may be any suitable type of network allowing transport of data communications across thereof. The network 122 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine-readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client devices may be encrypted using, for example, the Advanced Encryption Standard (AES) with a 128, 192, or 256-bit key size, or any other encryption standard known in the art.

Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. In an example embodiment, a server may include or have access to memory for storing instructions or applications for the performance of various functions and a corresponding processor for executing stored instructions or applications. For example, the memory may store an instance of the server configured to operate in accordance with the disclosed embodiments.

Figure 2:
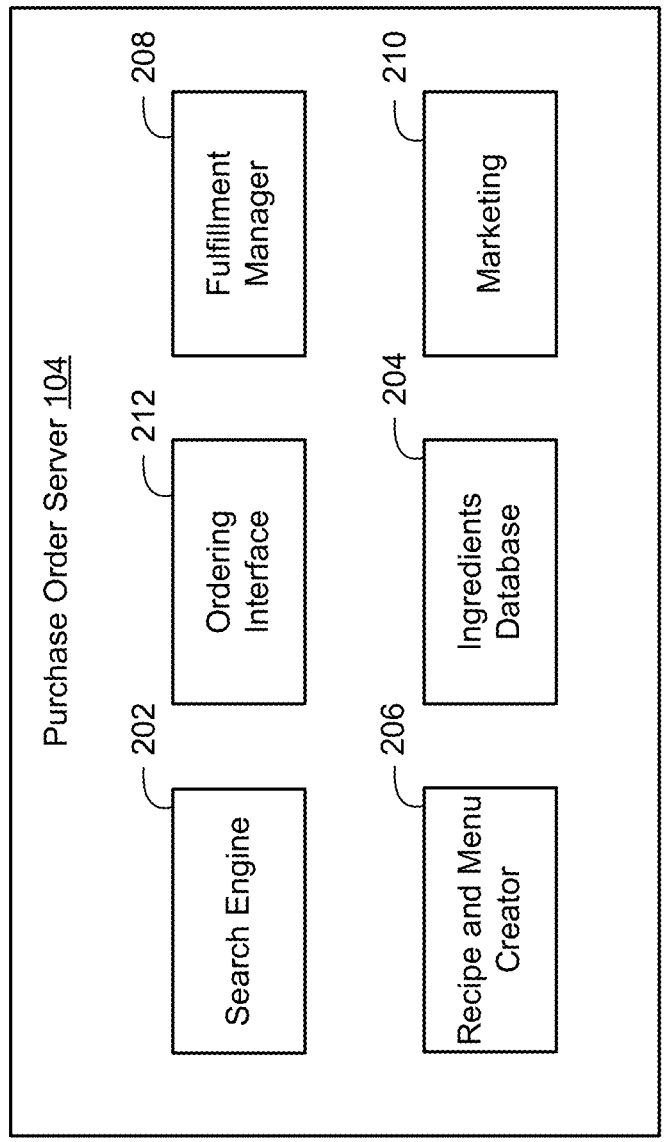
FIG. 2 illustrates a purchase order server according to an embodiment of the present invention.

Referring to FIG. 2, according to one embodiment, the purchase order server 104 includes search engine 202, ingredients database 204, recipe and menu creator 206, fulfillment manager 208, marketing module 210, and ordering interface 212. The purchase order server 104 may allow a user to provide a search request input from their client device to a search engine 202. A user may include individual chefs, purchasers, manufacturers (e.g., makers of food products), and distributors. Search engine 202 may comprise one or more processing components disposed on one or more processing devices or systems in a networked environment. The search engine 202 may operate in a manner similar to known search engine technologies, but with the inclusion of additional processing capabilities described herein.

The search request input may be entered into a search field that is presented to a user of client device 102 via ordering interface 212. Search engine 202 may receive the search request input to retrieve or generate search results in connection with ingredients database 204. The search may be for a particular recipe, manufacturer, distributor, user, and/or the like. Particularly, the search engine 202 may be configured to receive a product search request including one or more search terms or criteria, and generate search data including a plurality of products as a function of the search terms. For example, in one embodiment, the search engine 202 may search product data contained in the ingredients database 204. Ingredients database 204 may include lists of ingredients such as vegetables, meat, herbs, etc., based on ingredient availability data received from one or more fulfillment centers.

Search engine 202 may also be configured to receive a recipe search request. Recipe results may be retrieved from user database 110. A given recipe result may include a content entry and an ordering data template including a predetermined amount of ingredients that is linked to product data in ingredients database 204. In some cases, an identity of the author of each recipe may be provided via an icon, image or graphic along with a short title of the corresponding recipe.

Recipe and menu creator 206 may be configured to present the user with an option to create private recipes. The private recipes may include a specification for pre-preparing ingredients for dishes/meals. According to one embodiment, the specification of a given recipe may include a list of ingredients, a specified amount of the ingredients per serving, and preparation instructions for each ingredient. According to an alternative embodiment, the food ingredients may be packaged, labeled and branded according to the user's preferences that may be defined in the specification. The packaging, labeling, and branding may be for personal use, promotion, or sale. Creating the private recipes may be performed manually or by way of an electronic upload such as transferring a file (e.g., a document or spreadsheet) that includes a description of the individual recipes in a structured or unstructured manner. Creating the private recipes may further include creating a menu that includes one or more of the recipes that may be, for example, rotated on a periodic basis. In one embodiment, a user may select to purchase a menu and its recipes in a collective manner, rather than selecting individual ingredients.

Ordering interface 212 may create and manage purchase orders created by users. Search engine 202 and recipe and menu creator 206 may be communicatively coupled to ordering interface 212. A purchase order may be created by selecting individual ingredients, recipes, or menus and adding them to a "shopping cart." The user may be prompted by the ordering interface 212 to enter shipping and billing information prior to "checking out" and the ordering interface 212 completing the purchase order. Completed purchase orders may be transmitted from the ordering interface 212 to fulfillment manager 208.

The completed purchase orders may be managed by fulfillment manager 208. Fulfillment manager 208 may distribute the details of the purchase orders to one or more distribution centers for fulfillment. For example, fulfillment manager 208 may transmit a list of purchased items (food ingredients, amounts, recipes, menus, etc.) and shipping information to the distribution centers for retrieving, preparing, packing, and delivering items according to a purchase order. The fulfillment manager 208 may determine which fulfillment center to execute given purchase orders based on certain criteria such as, location, average fulfillment time, average fulfillment quality, product availability, or generally, the ability to fulfill a given purchase order. According to one embodiment, fulfillment manager 208 may include a load balancer that can determine the workload of the fulfillment centers and evenly distribute purchase orders.

Marketing module 210 may provide advertising tools for selling pre-prepared recipe food ingredients to wholesale or retail consumers as well as in an online marketplace. The marketing module 210 may further create a listing of offers from sellers in an online marketplace and forward orders from the online marketplace to the fulfillment centers. Additionally, advertisements for the pre-prepared recipe food ingredients may be coordinated with point of sales. The marketing module 210 may also provide recipe recommendations, discounts, and promotions to users.

Figure 3:
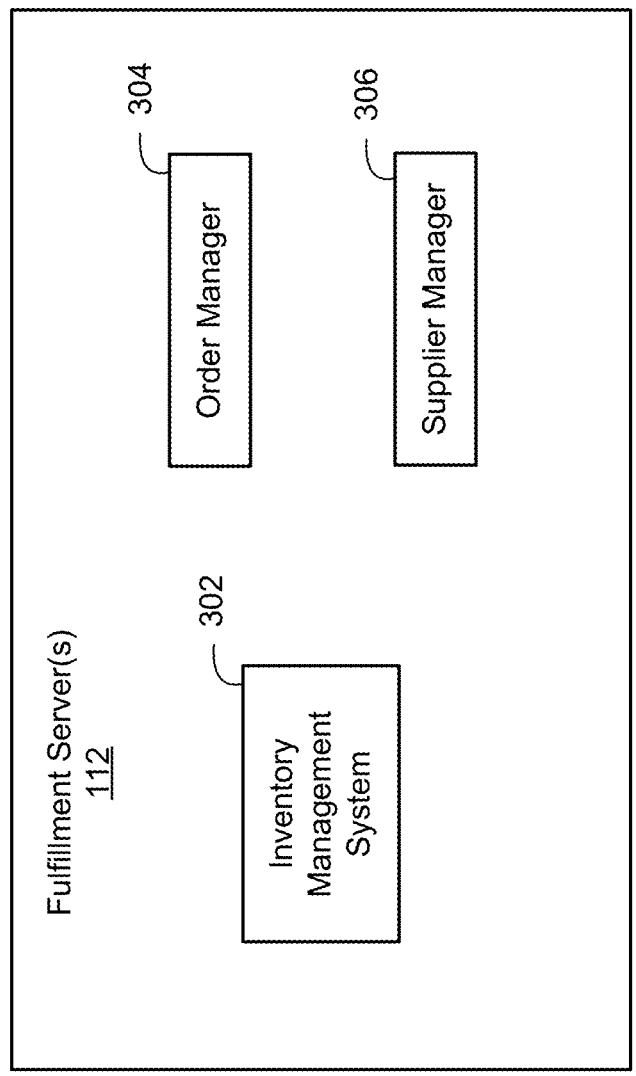
FIG. 3 illustrates a fulfillment server according to an embodiment of the present invention.

Referring to FIG. 3, fulfillment server(s) 112 includes inventory management system 302, order manager 304, and supplier manager 306. Inventory management system 302 may be configured to manage inventory levels of one or more fulfillment centers (not illustrated) communicatively coupled to fulfillment server(s) 112. Managing inventory levels may include ensuring a quantity of a product sufficient to meet fulfill purchase orders over a given period. According to one embodiment, the inventory levels may be used to calculate a fulfillment ability for each of the fulfillment centers. Supplier manager 306 may manage the sourcing of products (food ingredients) at one or more associated fulfillment centers.

A list of suppliers for each product and their pricing may be maintained by supplier manager 306. The supplier manager 306 may be communicatively coupled with inventory management system 302 to determine what products need to be ordered and from which supplier, e.g., are the products cheaper, fresher, and can be delivered within a given amount of time to the fulfillment centers. The inventory management system 302 may transmit data for ordering inventory to supplier manager 306.

For example, if handling costs are significant in a portion of a supply chain, then effective supply chain management would seek to minimize such costs. Similarly, inventory carrying costs could have a substantial effect on a supply chain and, therefore, minimizing such costs would also be desirable. Other important factors affecting a supply chain include: transaction costs, transportation costs, transportation delay, insurance costs. These factors may interact with each other. For example, a supplier might be able to minimize the transaction costs associated with a given product by purchasing an extremely large quantity of the product and then storing any units not immediately sold for later sale. However, the inventory carrying costs associated with storing a large quantity of the product might outweigh the savings in the transaction costs.

Order manager 304 may be configured to tracks or monitor the progression of orders being fulfilled by a fulfillment center. Sales and distribution module 306 may receive information of purchase orders, e.g., from purchase order server 104. The sales and distribution module 306 may communicate with order manager 304 to determine purchase orders that are ready for distribution/delivery.

Figure 4:
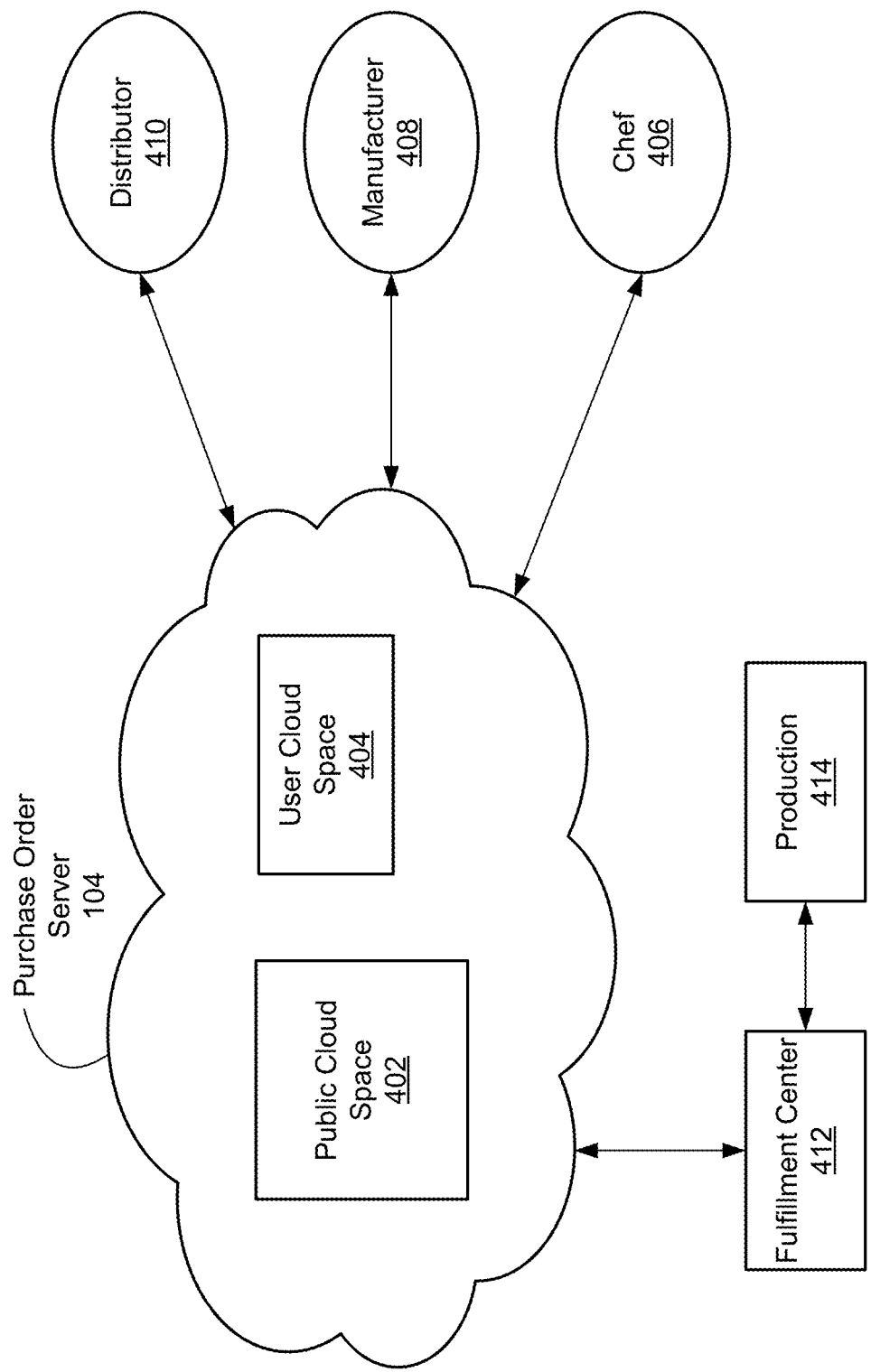
FIG. 4 illustrates an exemplary cloud computing system according to an embodiment of the present invention.

FIG. 4 presents an exemplary cloud computing system according to one embodiment. Purchase order server 104 may be provided within a software-as-a-service ("SAS") environment. As such, the purchase order server 104 may reside in "the cloud," as shown in FIG. 4. The cloud may be partitioned into public cloud space 402 and user cloud space 404. In this regard, public cloud space 402 may be accessible to all users (e.g., the chef 406, manufacturer 408, and distributor 410). The public cloud space 402 may therefore include recipes that are provided for general consumption to all users.

In some embodiments, the purchase order server 104 may be enabled to also define private cloud sections so that individual community members may have their own user cloud space 404. User cloud space 404 may be used to provide contents such as recipes. Access to user cloud space 404 may be limited to a given user and those invited by the user. In other words, the purchase order server 104 may provide global access to all users for some content, while private sections specific to some (e.g., based on subscription level or permission by an owner of the user cloud space 404).

Moreover, users may be provided with local databases and/or local recipe generation tools on their client devices. Content may be selectively uploaded/downloaded or exchanged between the public cloud space 402, user cloud space 404, and the client devices of chef 406, manufacturer 408, and distributor 410. In some embodiments, an application may be provided that may be run on a smart phone or other mobile communication device (e.g., client device 102) so that the local databases and/or local recipe generation tools may be accessed, or content in the cloud may be accessed.

Publicly available recipes may be placed in the public cloud space 402. However, private recipes may be placed in user cloud space 404 or other restricted access locations. In some cases, manufacturer 408, and distributor 410 may provide their own respective recipes (e.g., vendor recipes) that include products from the respective food manufacturers or distributors. In some cases, the recipes may include private label distributor items. The vendor recipes may be publicly available in some embodiments. In other cases, the vendor recipes may be provided to private cloud sections of specific users of respective vendors.

In other embodiments, the public cloud space may include exclusive portions that have subscription based or other access limitations. Higher level subscription purchasers may be entitled to access to restricted recipe content. The restricted recipe content may be associated with featured chefs, sponsored products, enhanced services, and/or the like. Vendors (e.g., manufacturer 408 and/or distributor 410) may receive access to content and/or permission to post content based on access restrictions that may be defined upon registration. In some embodiments, the vendors may also receive exposure to certain information about users to identify leads or possible interaction opportunities with specific users. Furthermore, in some cases, a subscription level may determine the type and/or amount of information that a vendor may receive about users.

Fulfillment center 412 may be communicatively coupled to production 414 via any of various communication methods (e.g., local network communications, Internet, intranet, LAN, etc.). Production 414 may include one or more computing devices and/or machinery at production sites that prepare grocery items. The production 414 may receive instructions from fulfillment center 412 based on instructions or orders received from purchase order server 104.

Figure 5:
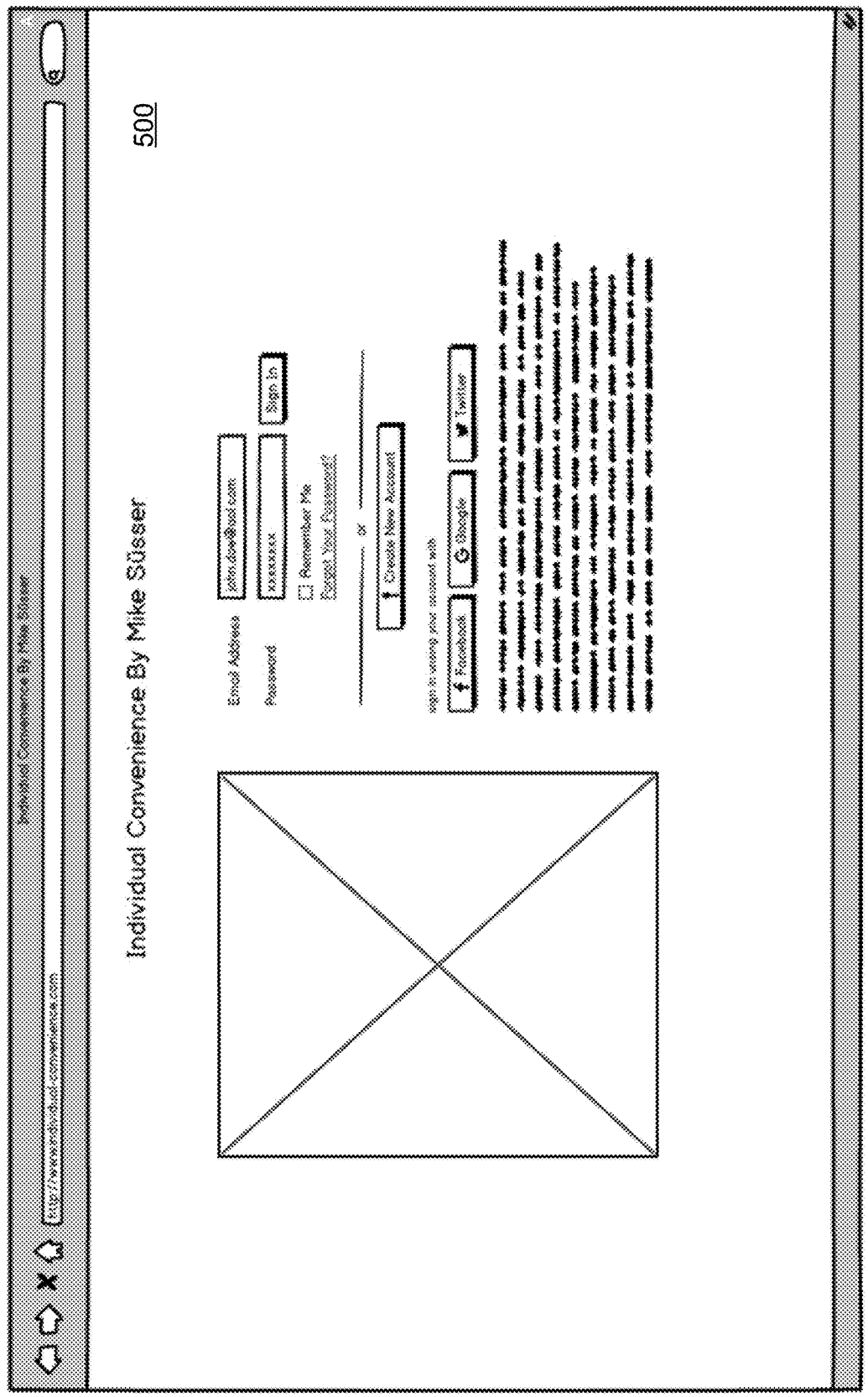
FIG. 5 illustrates an exemplary interface for user login according to an embodiment of the present invention.

FIG. 5 presents an exemplary interface for user login according to an embodiment of the present invention. A user may create an account and sign in on the depicted login interface 500. Alternatively, a user may sign in by using an account with other online service accounts, such as Facebook, Google, or Twitter. Once signed in, a user may access their account to make food purchases and create recipes.

Figure 6:
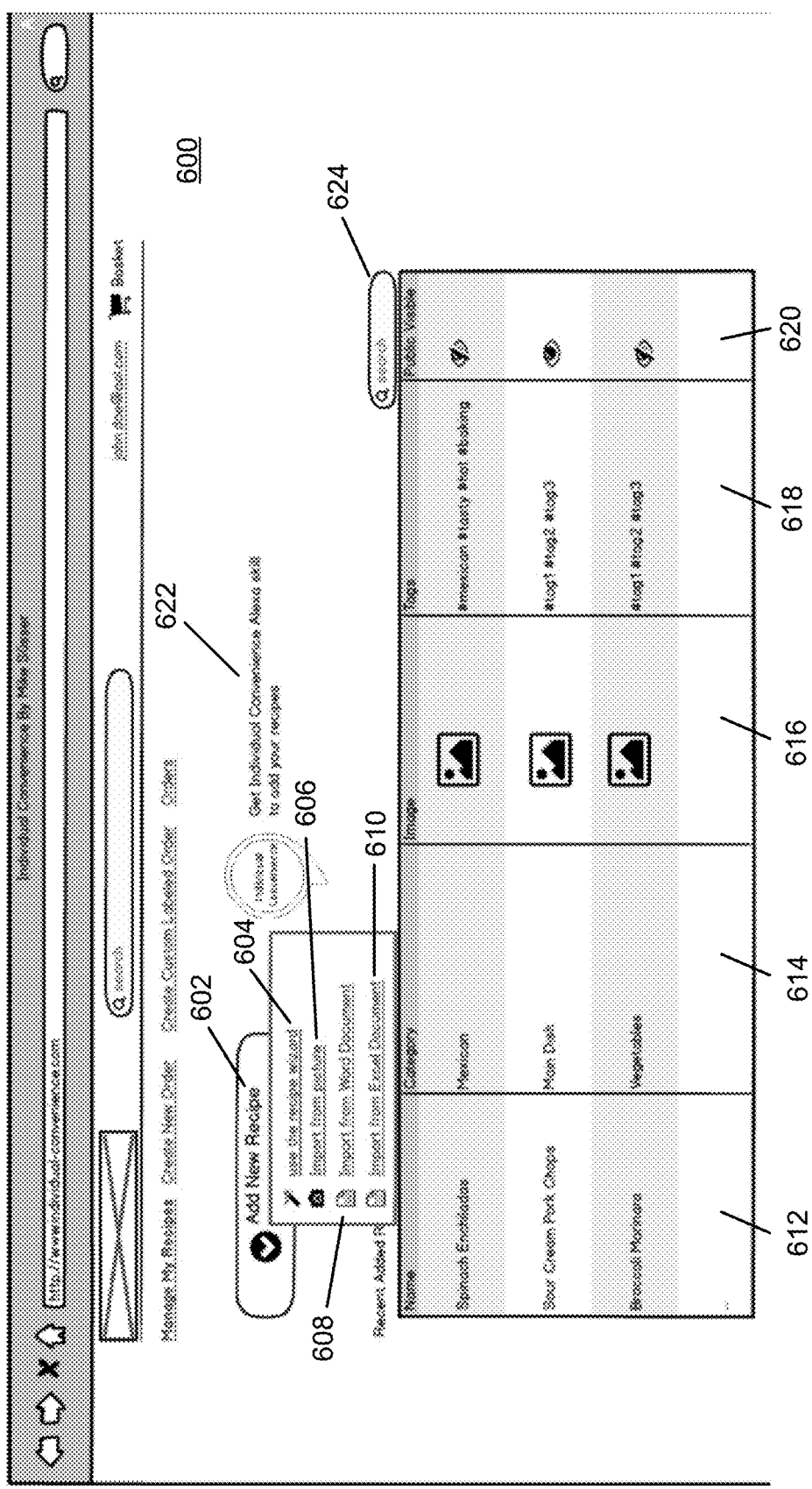
FIG. 6 illustrates an exemplary interface for managing recipes according to an embodiment of the present invention.

FIG. 6 presents an exemplary interface for managing recipes by customer/chef users according to an embodiment of the present invention. Recipe management interface 600 may be provided to the user for creating new recipe content as well as viewing and editing existing recipe content created by the user. The recipe management interface 600 may include an "add new recipe" 602 feature. A user may select the "use the recipe wizard" 604 to manually create a new recipe content. Alternatively, import from picture 606, import from Microsoft Word document 608, or import from Microsoft Excel document 610 may be provided to create recipes by extracting text, characters, and/or numbers from files and converting them into recipe content. Import features of the "add new recipe" 602 are not limited to the disclosed formats and may include any file format containing text, characters, or numbers. Additionally, a user may also install a feature, skill, or application (622) to a smart device for enabling a cloud-based voice service or a virtual assistant feature, such as Amazon's Alexa skill, to support order creation, adding new recipes or content according to embodiments of the disclosed systems and methods.

Each recipe content entry may be organized with name 612, category 614, image, 616, and tags 618. The search 624 function may be used to find existing recipes created by the user. Recipes may be searched by, for example, name 612, category 614, or tags 618. Public visible 620 may be toggled for each recipe to enable the recipe content to be visible by the public. Otherwise, disabling the recipe content for public view allows only the user, or in some embodiments, another user authorized by the user to be able to view the recipe.

Figure 7A:
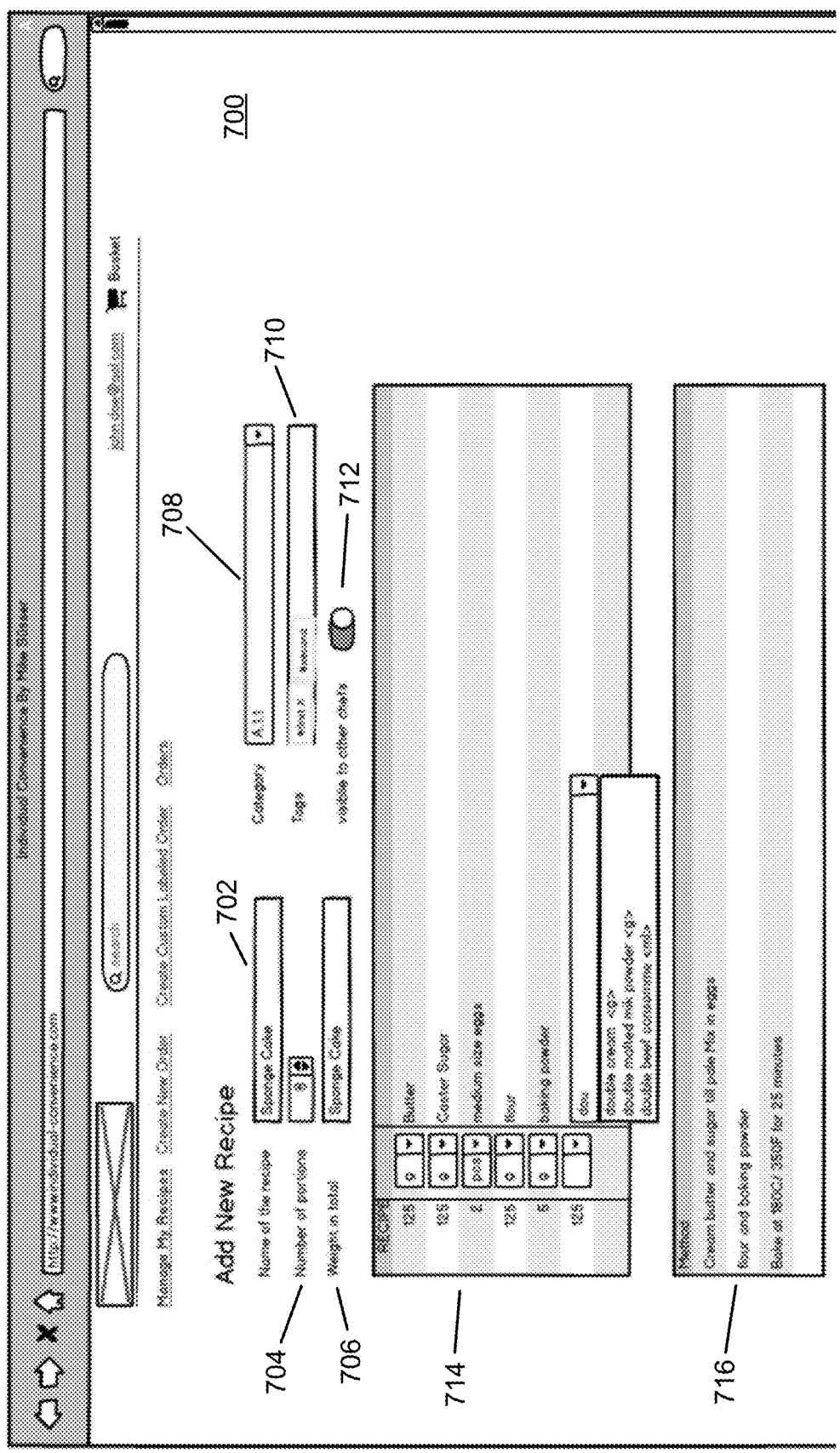
FIGS. 7A and 7B illustrate an exemplary interface for adding new recipes according to an embodiment of the present invention.
Figure 7B:
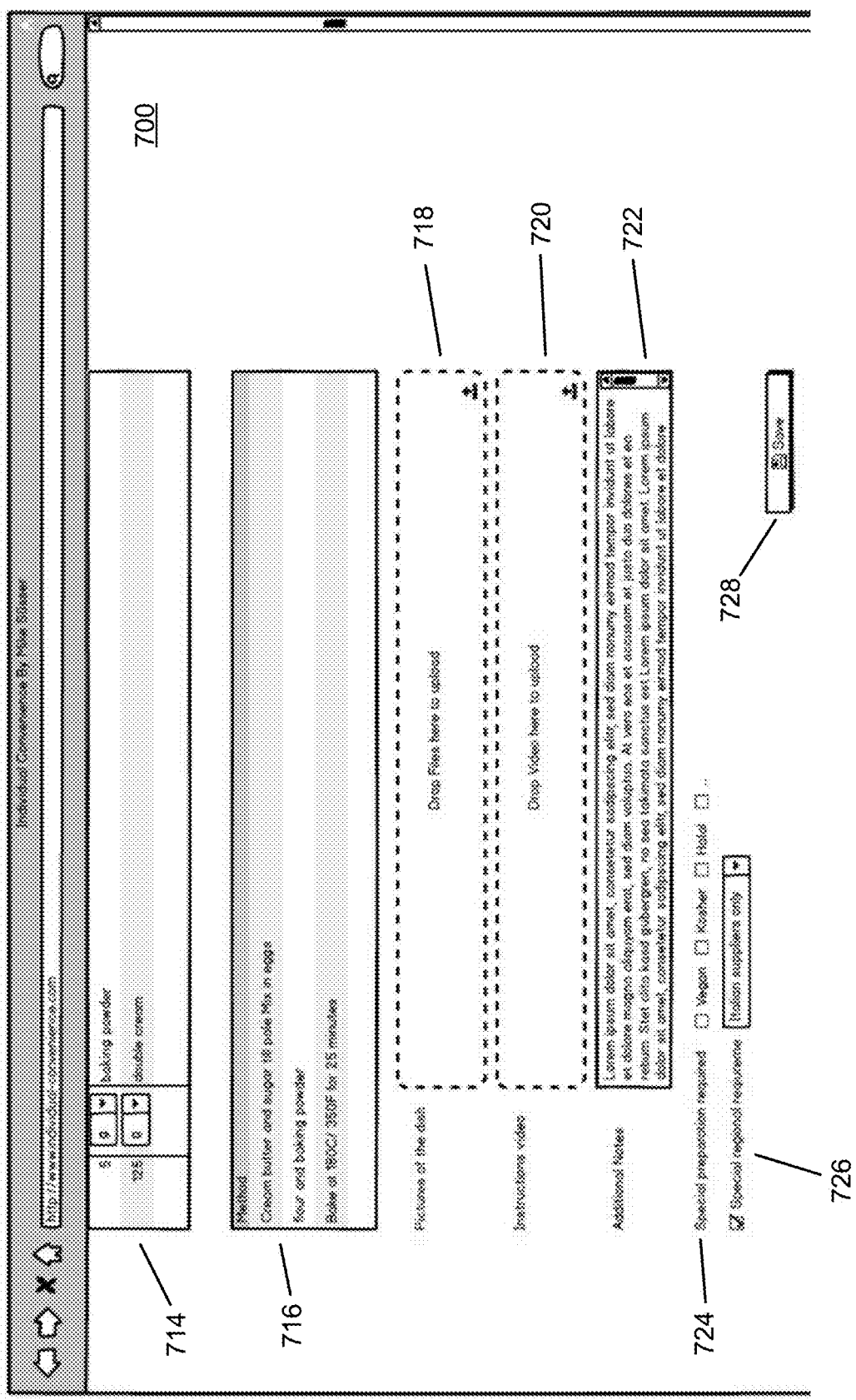

FIGS. 7A and 7B presents an exemplary interface for adding new recipes according to an embodiment of the present invention. Selecting the "add new recipe" 602 may provide the user with an add new recipe interface 700. According to one embodiment, a recipe may comprise a template for ordering grocery or food ingredients in specific amounts and in a given preparation. Referring to FIG. 7A, a recipe may include information provided by the user into data fields such as recipe name 702, number of portions 704, weight in total 706, category 708, tags 710, and visibility to other chefs 712. Recipe section 714 includes input fields for ingredient items, ingredient amount and in measuring units. Method section 716 includes a text field where the user may enter preparation instructions for the ingredients.

Optionally, the user may also provide aids via picture upload 718 and video upload 720, as illustrated in FIG. 7B. Additional notes section 722 comprises a text field for entering comments such as suggestions, warnings, and substitutes, for example. Other information may be provided for the recipe including special preparation 724 (for vegan, kosher, halal). Special regional requirement 726 may also be used to specify a supplier location requirement. Save 728 may be selected to finalize and save the recipe content entry.

Figure 8:
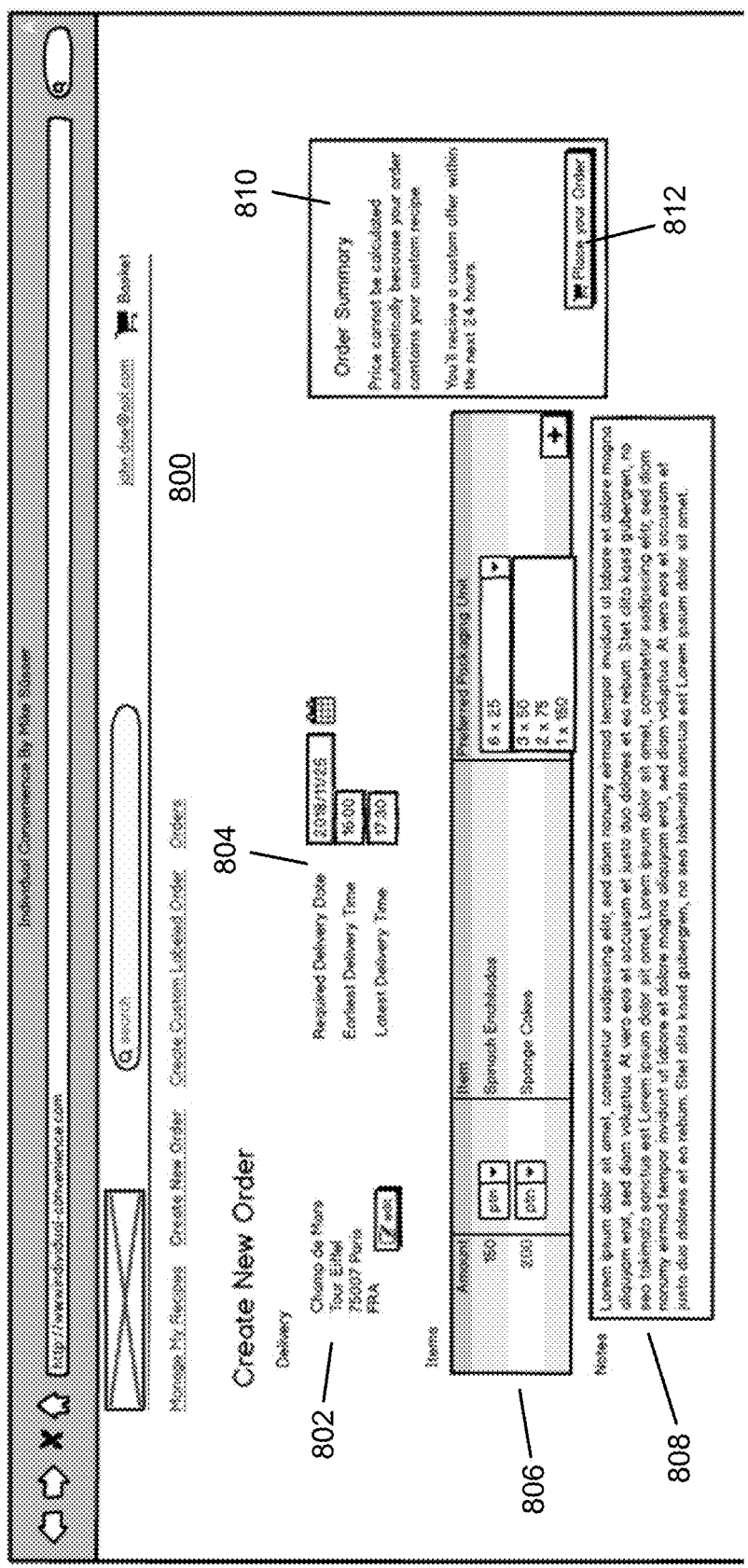
FIG. 8 illustrates an exemplary interface for creating a new order according to an embodiment of the present invention.

FIG. 8 presents an exemplary interface for creating a new order according to one embodiment. Create new order interface 800 includes delivery address 802 for user input of a location to deliver the order. The delivery date and time (804) may also be selected by the user. Order items 806 provides fields for selecting recipes, amounts for the selected recipes, and packaging unit. Notes 808 may also be provided for the user to specify for example, preparation, delivery or handling instructions. Order summary 810 presents a summary of the pricing for the order and an order placement button 812 to submit the order.

Figure 9:
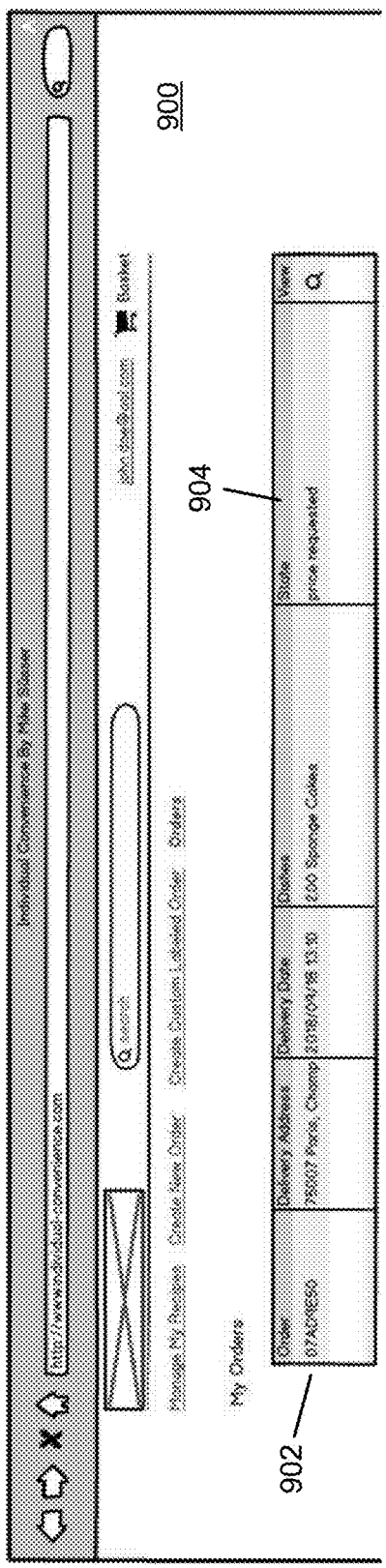
FIGS. 9 and 10 illustrate an order status interface according to an embodiment of the present invention.
Figure 10:
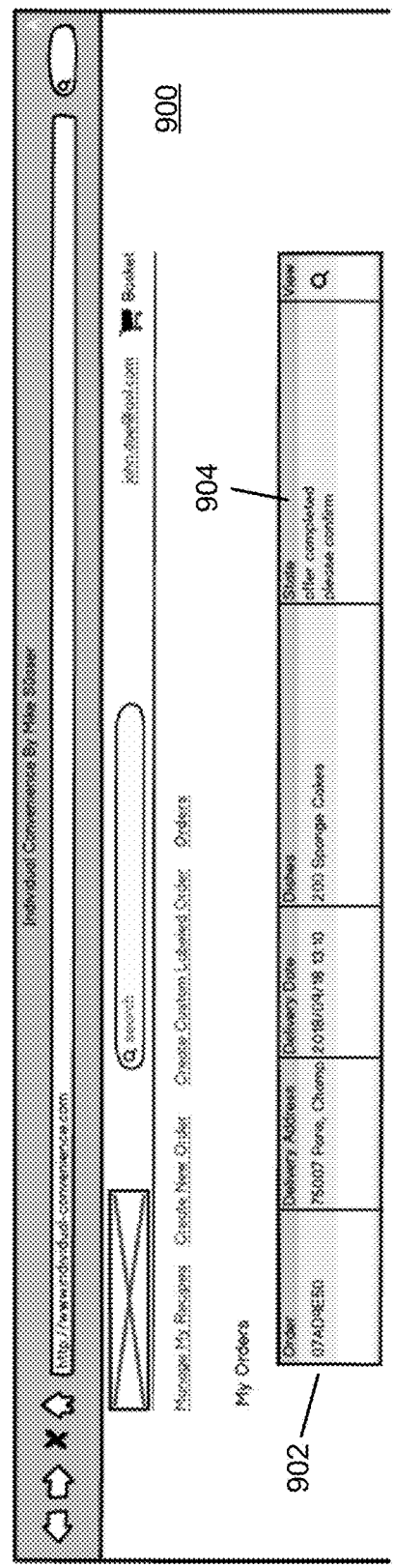

FIG. 9 depicts an order status interface including a pending item order 902 for a recipe with a state 904 indicated by "price requested." Submitting an order may cause a solicitation or posting to request prices from suppliers for each recipe in the order. In turn, the suppliers may place offers to fulfill one or more recipes from a given order. When an offer is submitted by a supplier, the state 904 of the pending item order 902 may change to indicate that an offer has been completed by a supplier and requires confirmation, as illustrated in FIG. 10.

Figure 11:
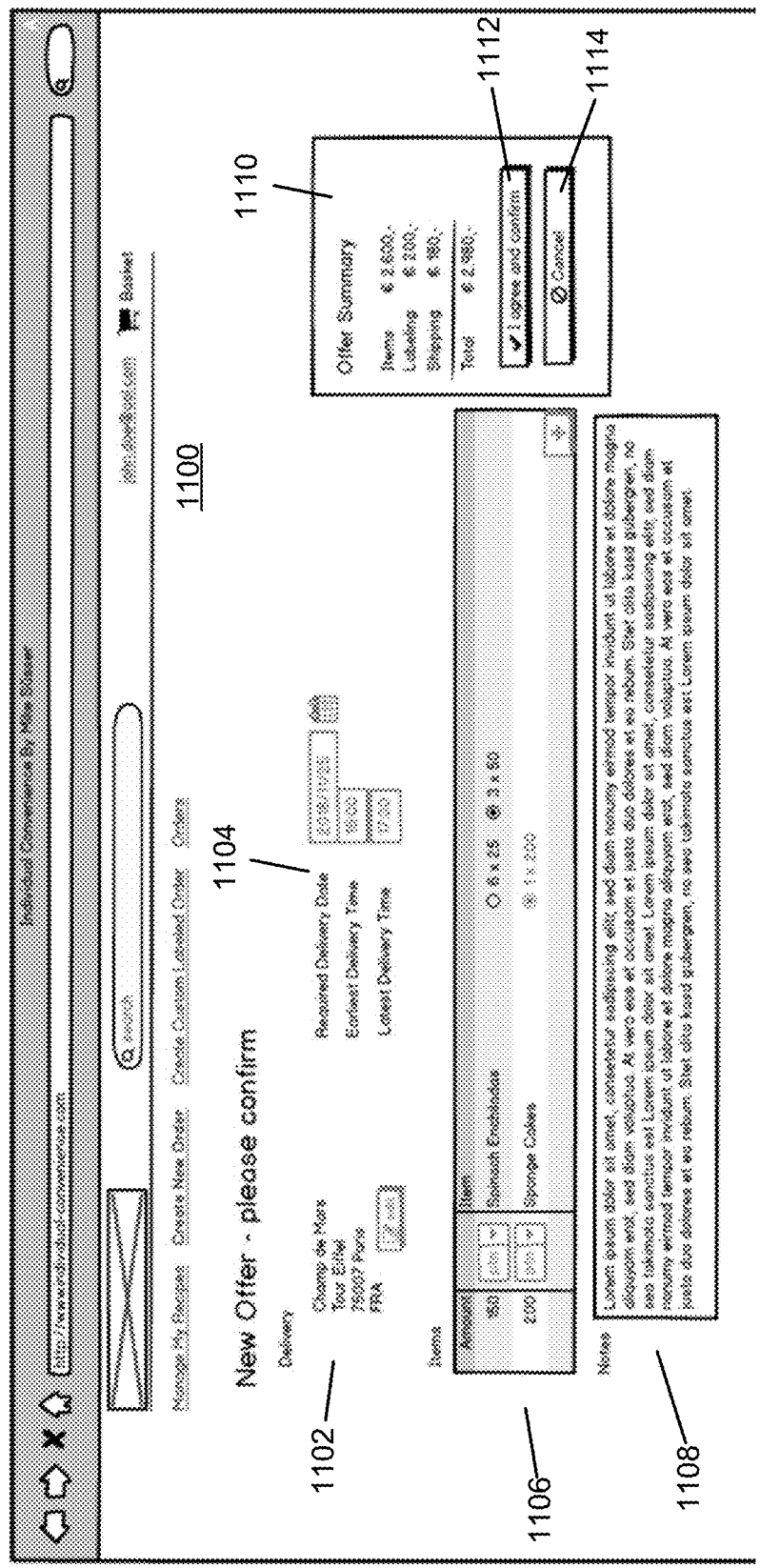
FIG. 11 illustrates an exemplary interface for confirming an order offer according to an embodiment of the present invention.

FIG. 11 presents an exemplary interface for confirming an order offer according to one embodiment. The offer confirmation interface 1100 may include the delivery address 1102 and delivery date and time 1104 that correspond to the order. Offer items 1106 may indicate an offering of at least one recipe from the order in the ordered amount and packaging unit. Notes 1108 may also be provided for the supplier to specify for example, preparation, delivery or handling details. Order summary 1110 presents a summary of the offer including a breakdown of pricing. The user may agree and confirm 1112 or cancel 1114 the order or offer.

Figure 12:
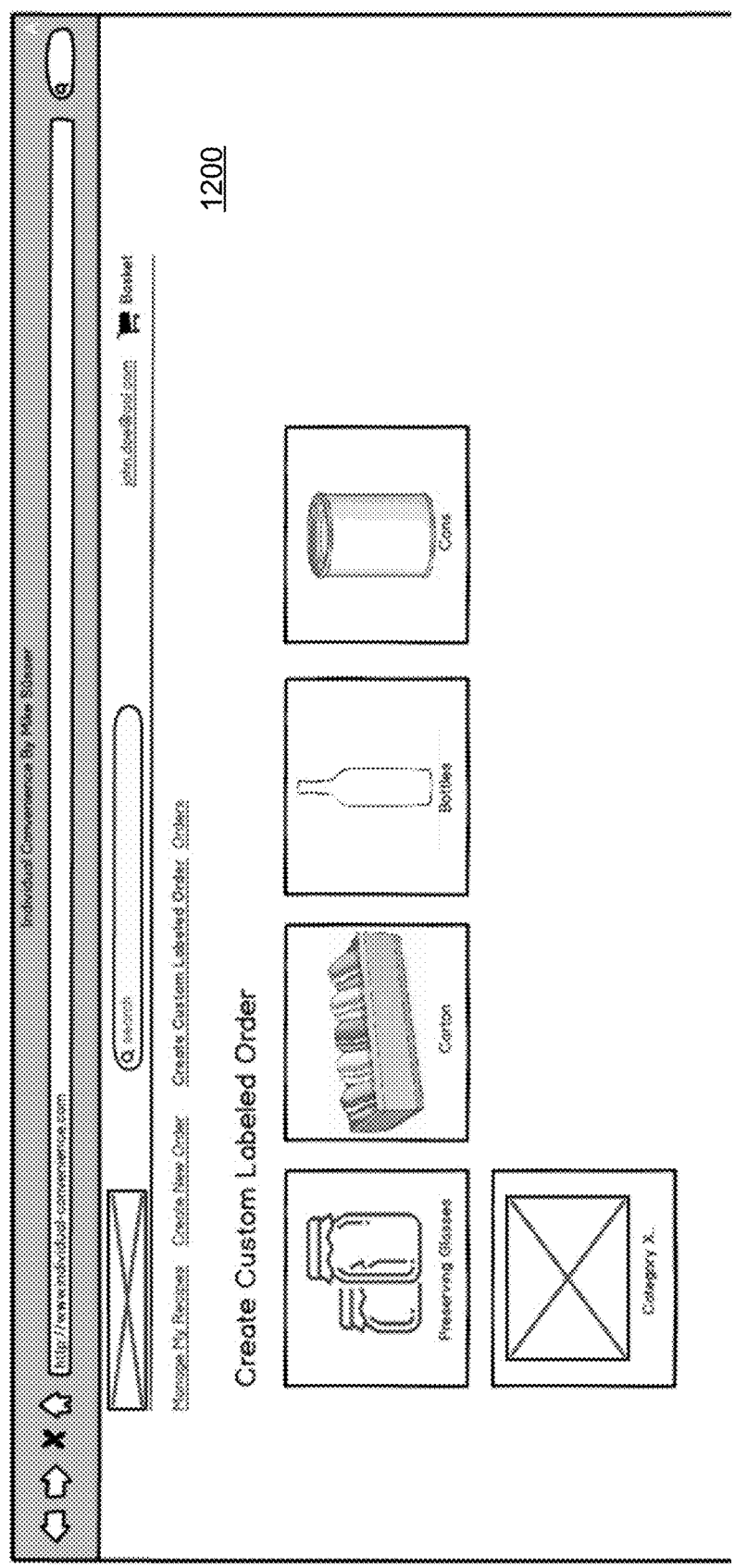
FIGS. 12 through 14 illustrate exemplary interfaces for creating custom labeled orders according to one embodiment.
Figure 13:
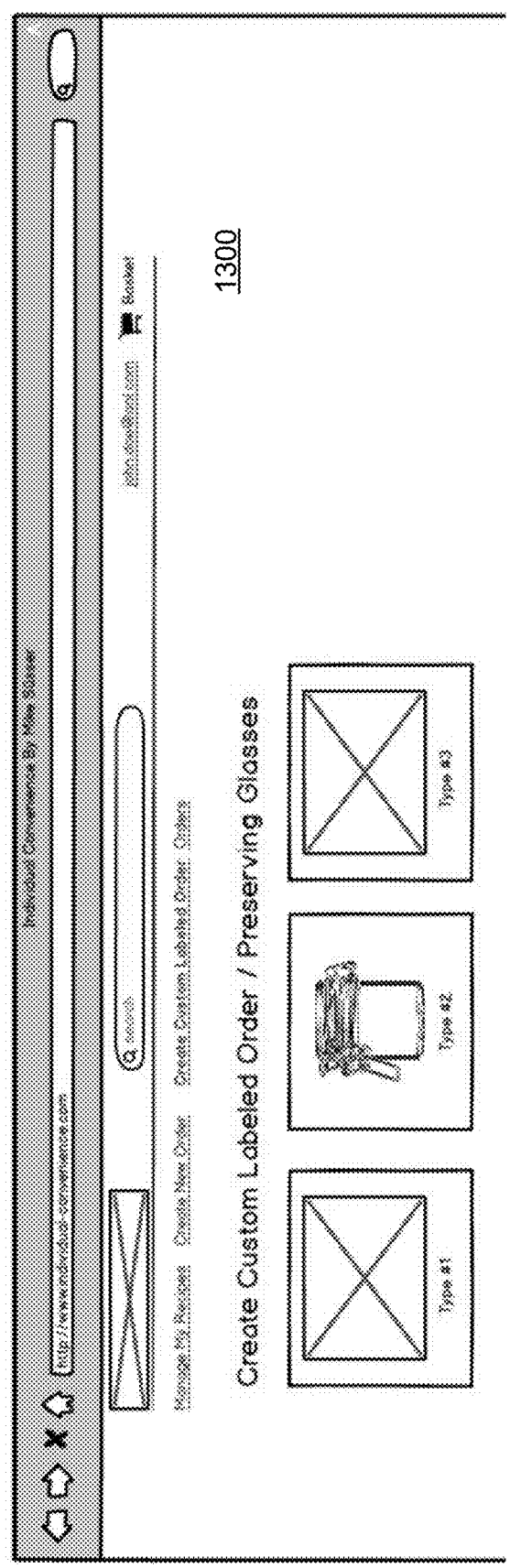
Figure 14:
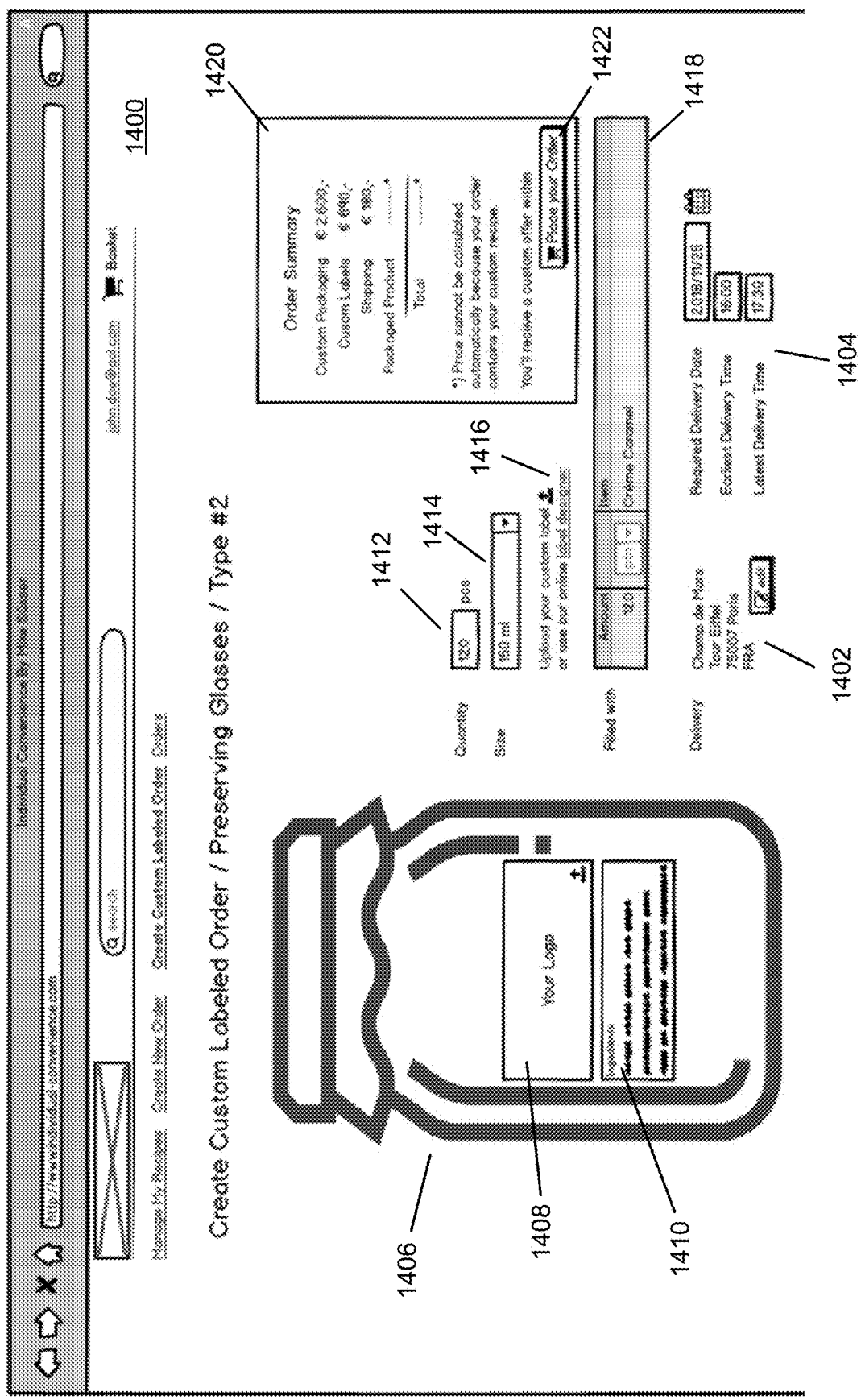

FIGS. 12 through 14 present exemplary interfaces for creating custom labeled orders according to one embodiment. For example, order interface 1200 may be provided for selecting a vessel category and then order interface 1300 may allow the user to select a type within the vessel category. Order interface 1400 includes delivery address 1402 for user input of a location to deliver the order. The delivery date and time (1404) may also be selected by the user. "Filled with" 1418 provides fields for selecting a recipe to fill in a vessel selected in previous order interfaces 1200 and 1300 and amounts of the vessels. A preview 1406 presents a preview of the selected vessel including logo label 1408 and an ingredients label 1410. A logo image file may be uploaded and displayed in logo label 1408 by selecting logo label 1408. Alternatively, label designer 1416 may be used to design a label for the selected vessel. Ingredients label 1410 may be populated with ingredients included in a recipe corresponding to "filled in" 1418 and data from an ingredients database including nutritional values and allergen warnings. Fields for specifying order quantity 1412 and size 1414 may also be provided. Order summary 1420 presents a summary of order pricing (and breakdown) and an order placement button 1422 to submit the order.

Figure 15:
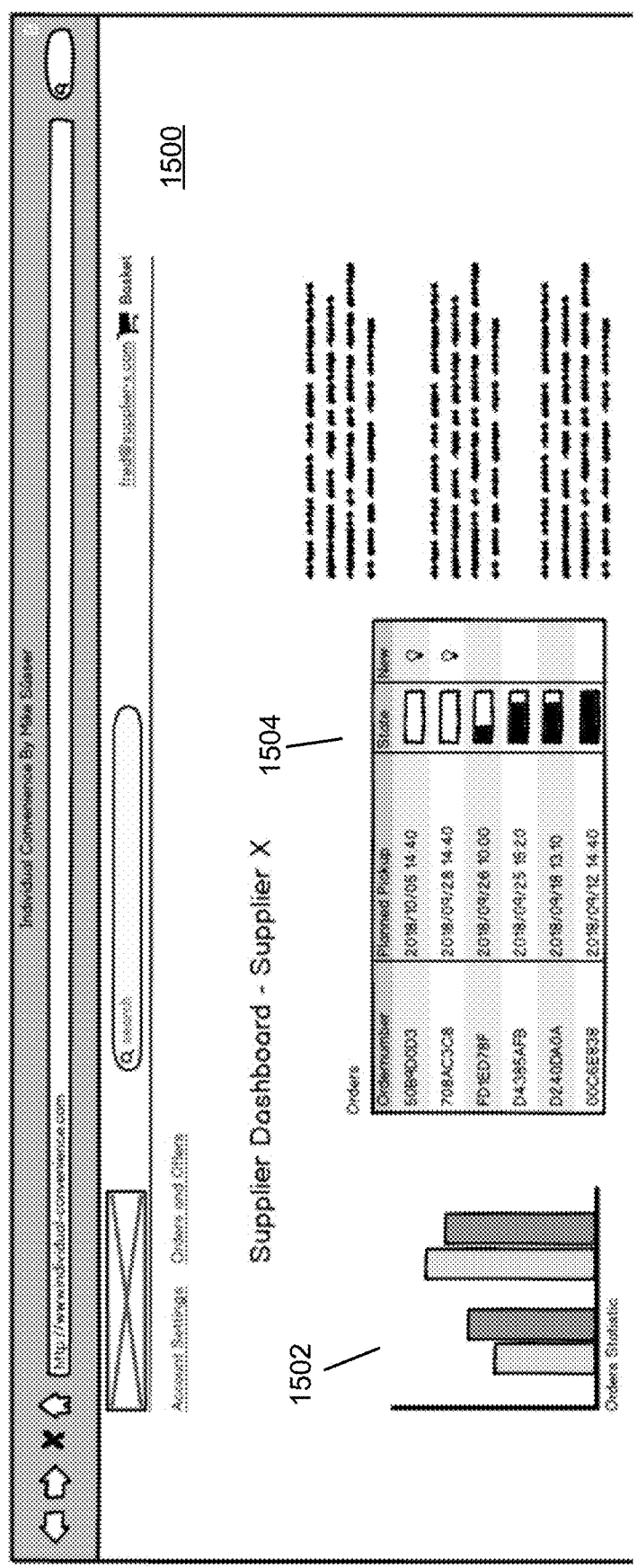
FIG. 15 illustrates an exemplary supplier dashboard according to an embodiment of the present invention.

Suppliers may also use the disclosed system to fulfill or service orders. FIG. 15 presents an exemplary supplier dashboard according to an embodiment of the present invention. Supplier users may be provided with interfaces for managing orders. Supplier dashboard interface 1500 may include orders statistic 1502 and orders record 1504. Orders statistic 1502 may present a graph that displays an amount of orders over time, e.g., monthly, weekly. Orders record 1504 may provide a listing of orders and their status— including order number, planned pick-up date and time, state indication, and new order indication.

Figure 16:
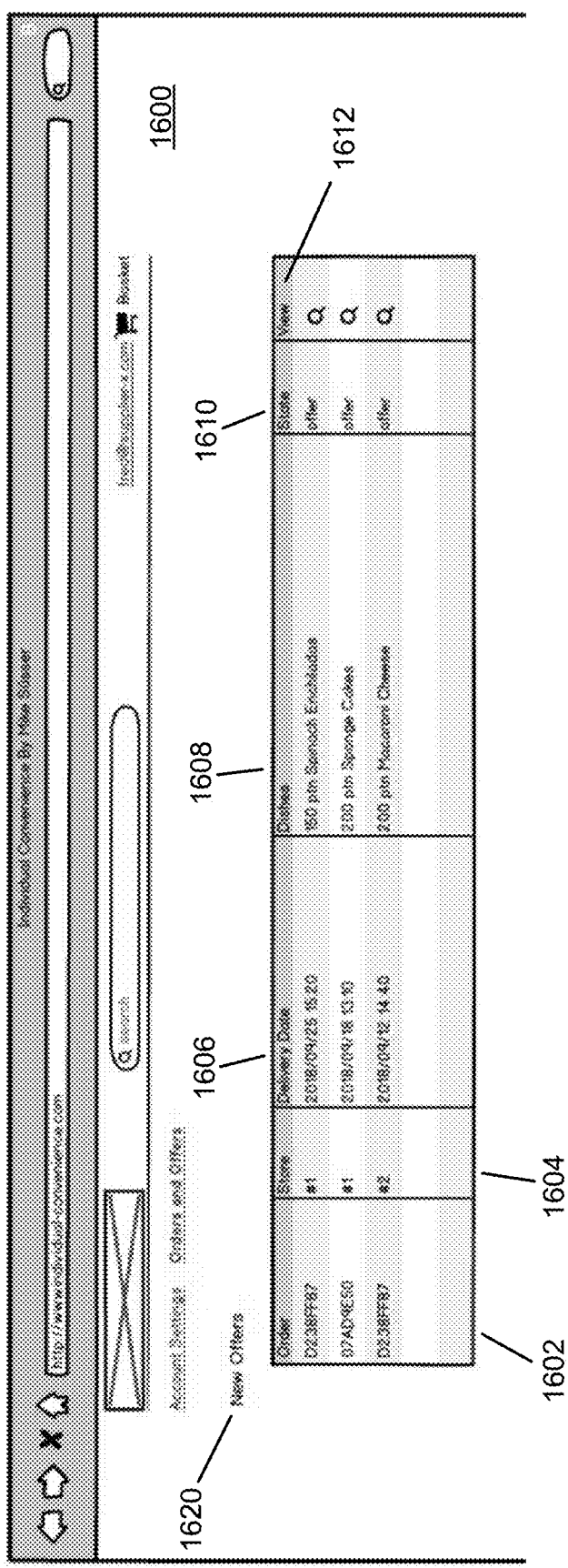
FIG. 16 illustrates an exemplary orders and offers interface according to an embodiment of the present invention.

A supplier may view new offers via an orders and offers interface 1600, such as the one illustrated in FIG. 16. Orders and offers interface 1600 may include a new offers table 1620. New offers table 1620 may contain rows for each offer entry and columns for providing order identifier 1602, store identifier 1604, delivery date 1606, dishes 1608, state 1610, and view details 1612 for each order entry.

Figure 17:
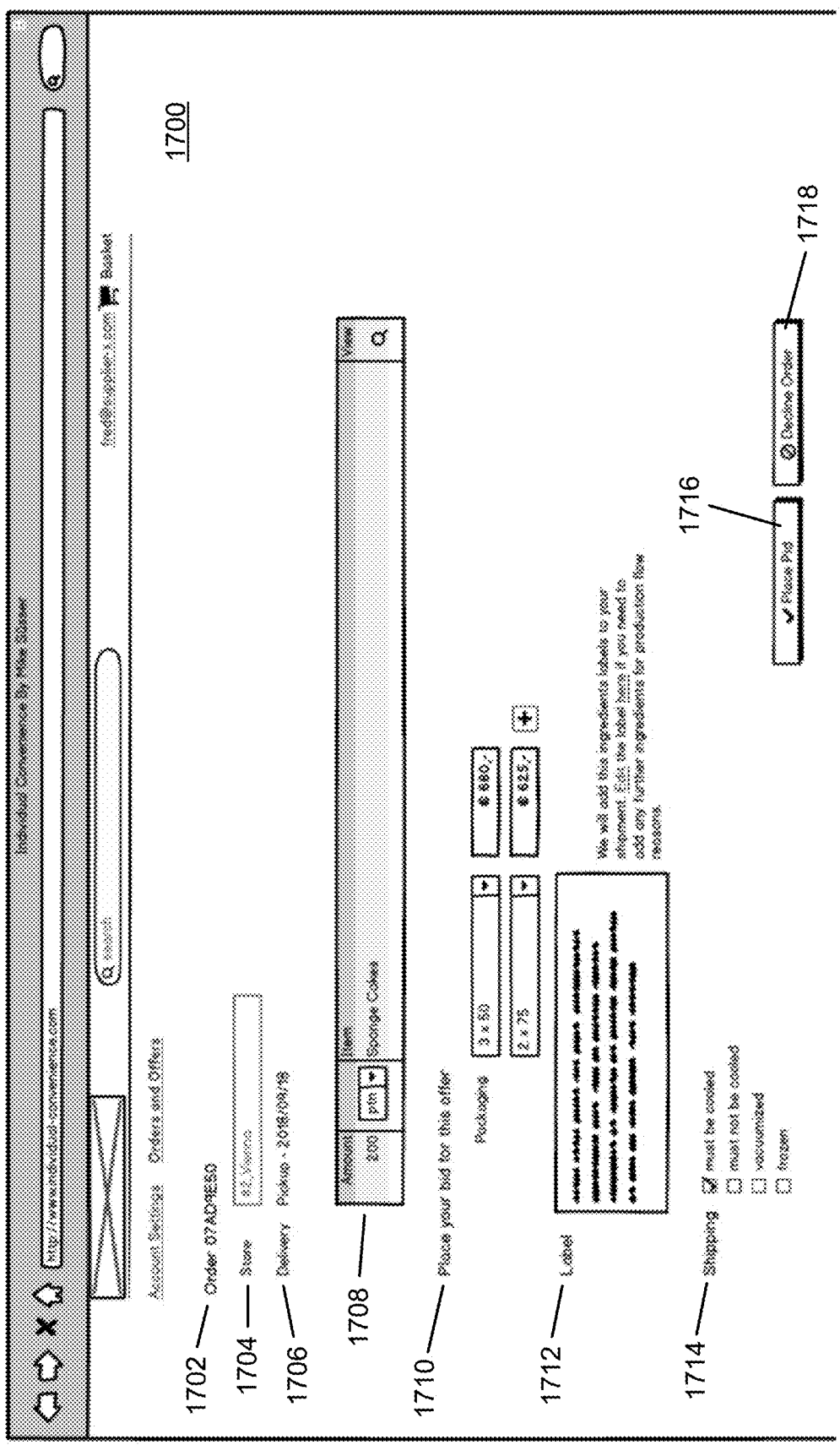
FIG. 17 illustrates an exemplary order screen according to an embodiment of the present invention.

Selecting view details 1612 for a given order entry may present an order screen as illustrated in FIG. 17. Order entry interface 1700 includes order identifier 1702, store identifier 1704, delivery date 1706, and order items 1708. A supplier may place a bid 1710 to specify packaging and price offer. Label 1712 includes a preview of a label for the packing of the order items. The label 1712 may be edited to add, for example, further ingredients or identify that the item will be processed in a facility that also processes other foods that may include allergens. Shipping preference 1714 may be indicated to the supplier. The supplier may place bid 1716 as specified in bid 1710 or decline order 1718.

Figure 18:
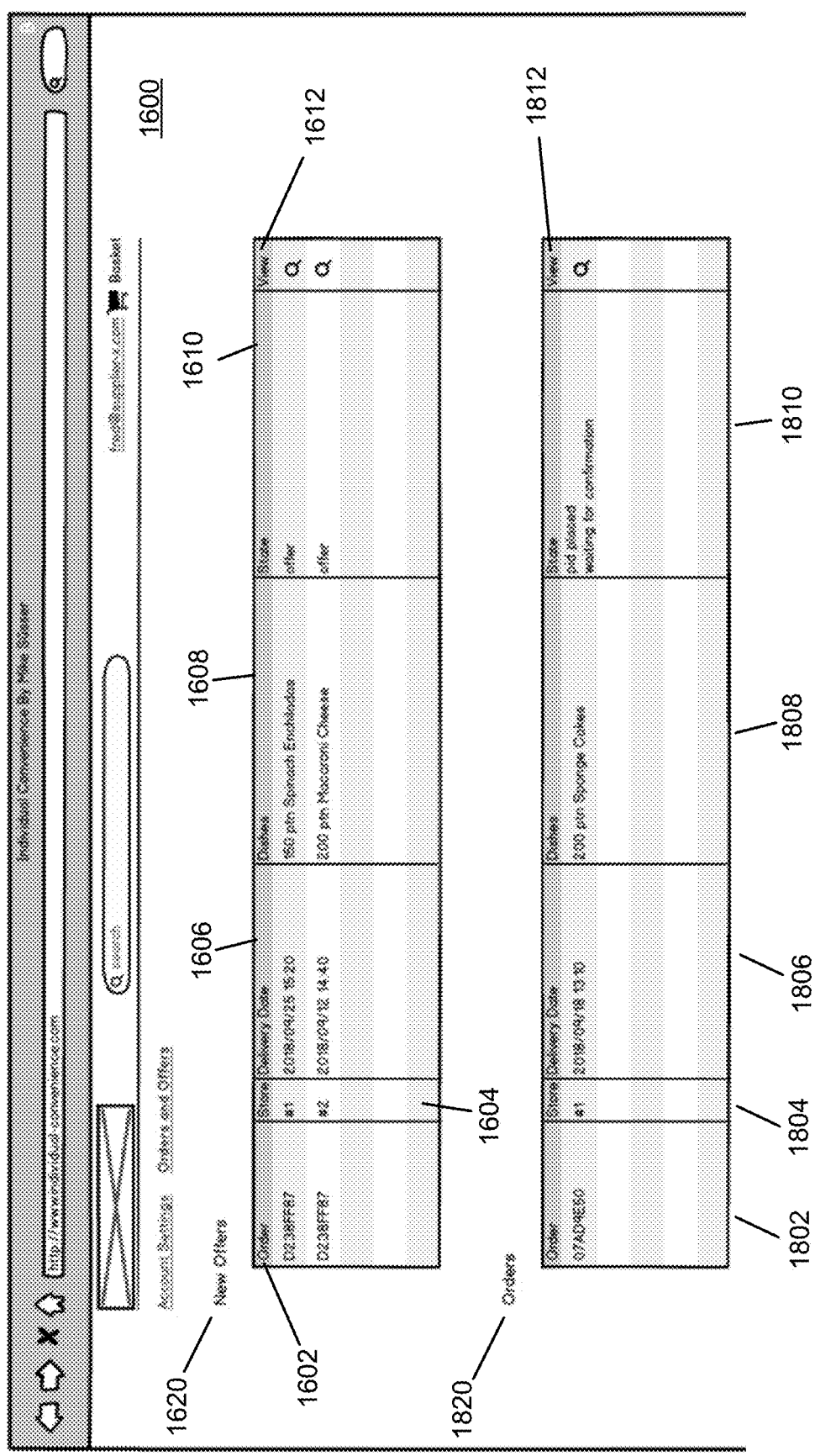
FIG. 18 illustrates an exemplary orders and offers interface according to an embodiment of the present invention.

When a bid for offer has been placed, it may be displayed on orders and offer interface 1600 as illustrated in FIG. 18. Orders and offers interface 1600 may further include a table for orders 1820. Orders 1820 may contain rows for each order entry and columns for providing order identifier 1802, store identifier 1804, delivery date 1806, dishes 1808, state 1810, and view details 1812 for each order entry.

Figure 19:
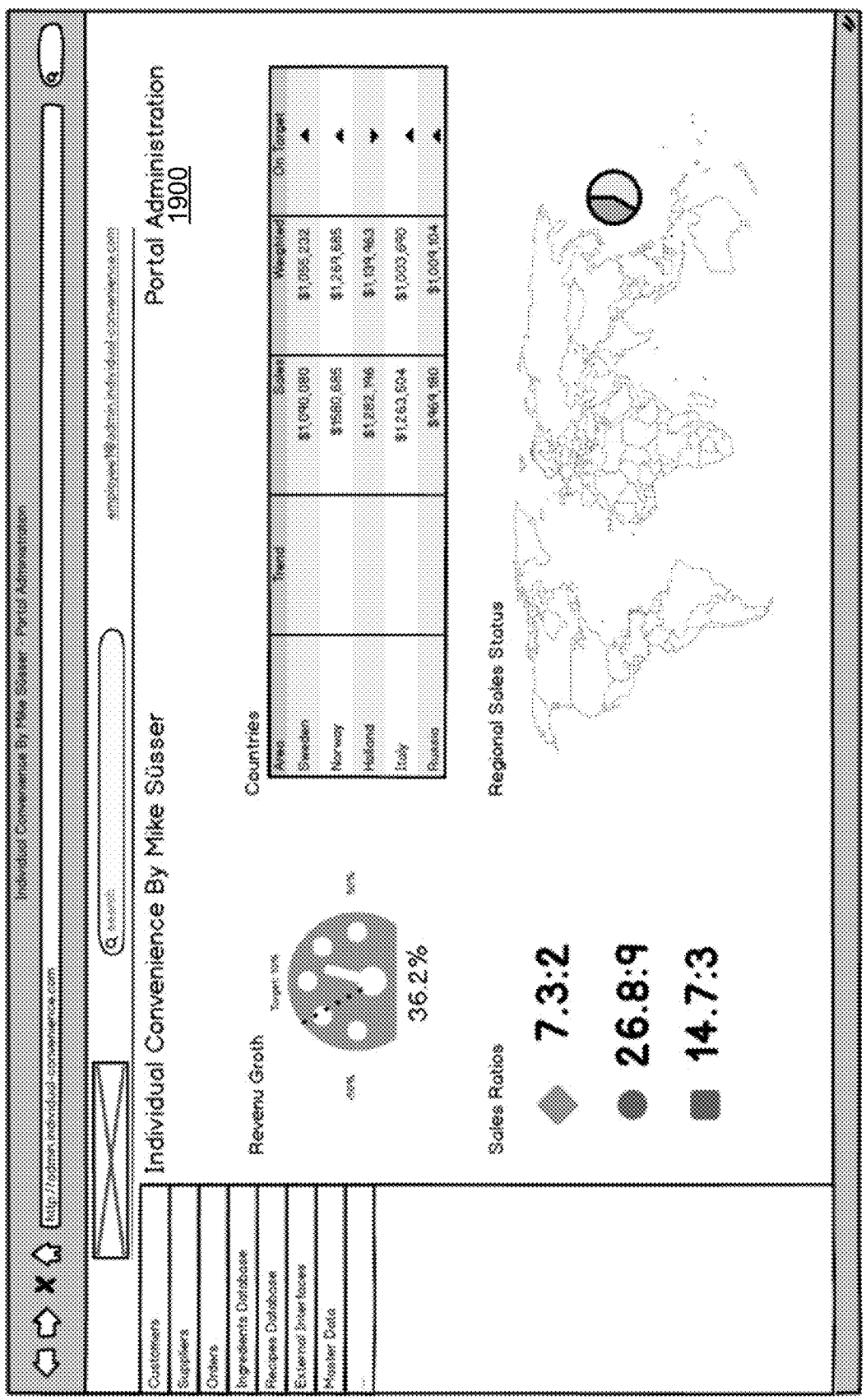
FIG. 19 illustrates an exemplary sales dashboard according to one embodiment of the present invention.

A backend interface may be further provided for managing the disclosed system by an administrator. FIG. 19 presents an exemplary sales dashboard according to one embodiment of the present invention. An administrator may view revenue growth, sales ratios, sales by country and regional sales status on portal administration interface 1900. Sales targets may be configured by the administrator, such as overall sales performance or regional sales performance by month, quarter, year, etc.

Figure 20:
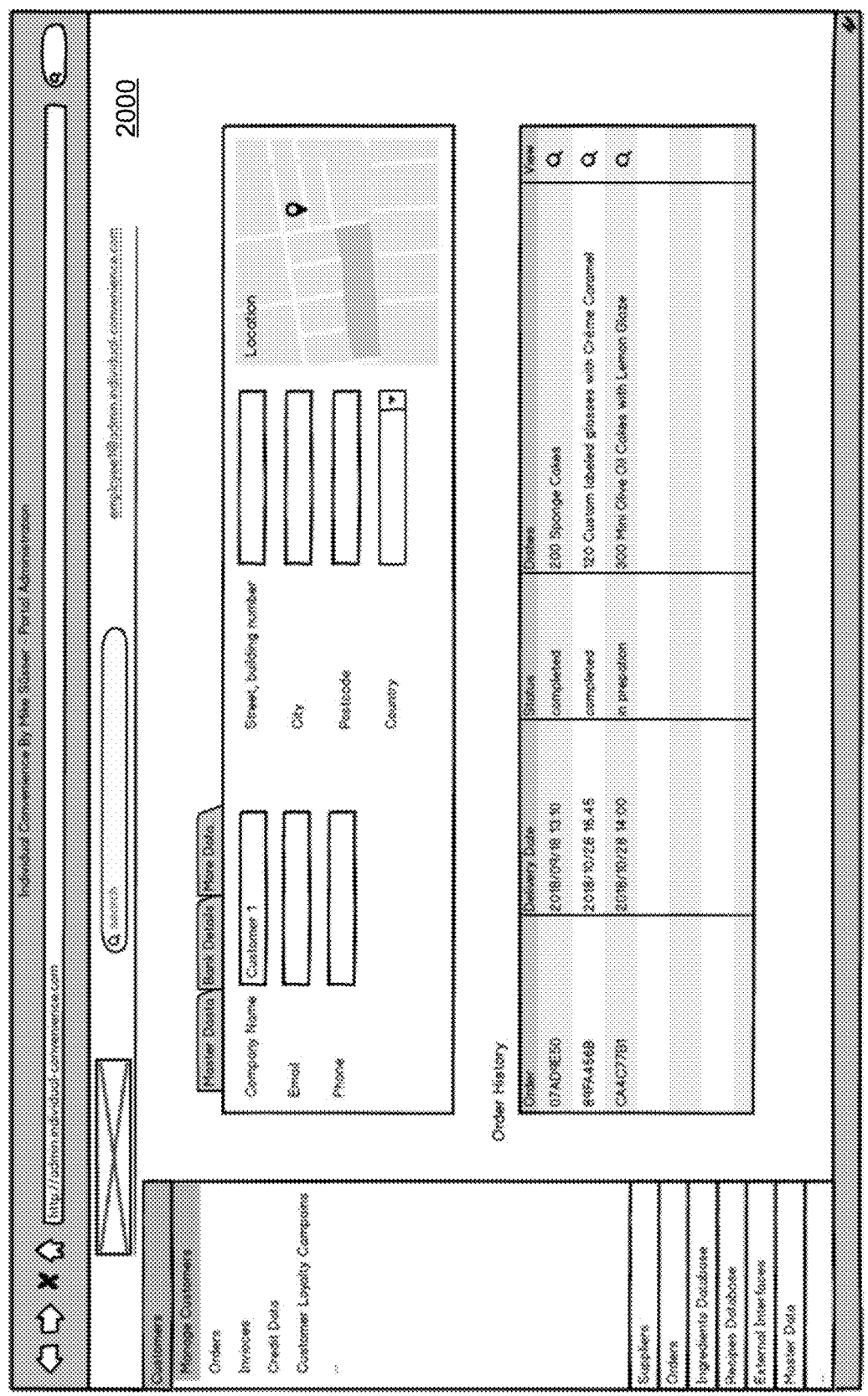
FIG. 20 illustrates an exemplary interface for managing customer information according to one embodiment.

FIG. 20 presents an exemplary interface for managing customer information according to one embodiment. Customer management interface 2000 may be selected to view and edit information, such as customer information and customer order history.

Figure 21:
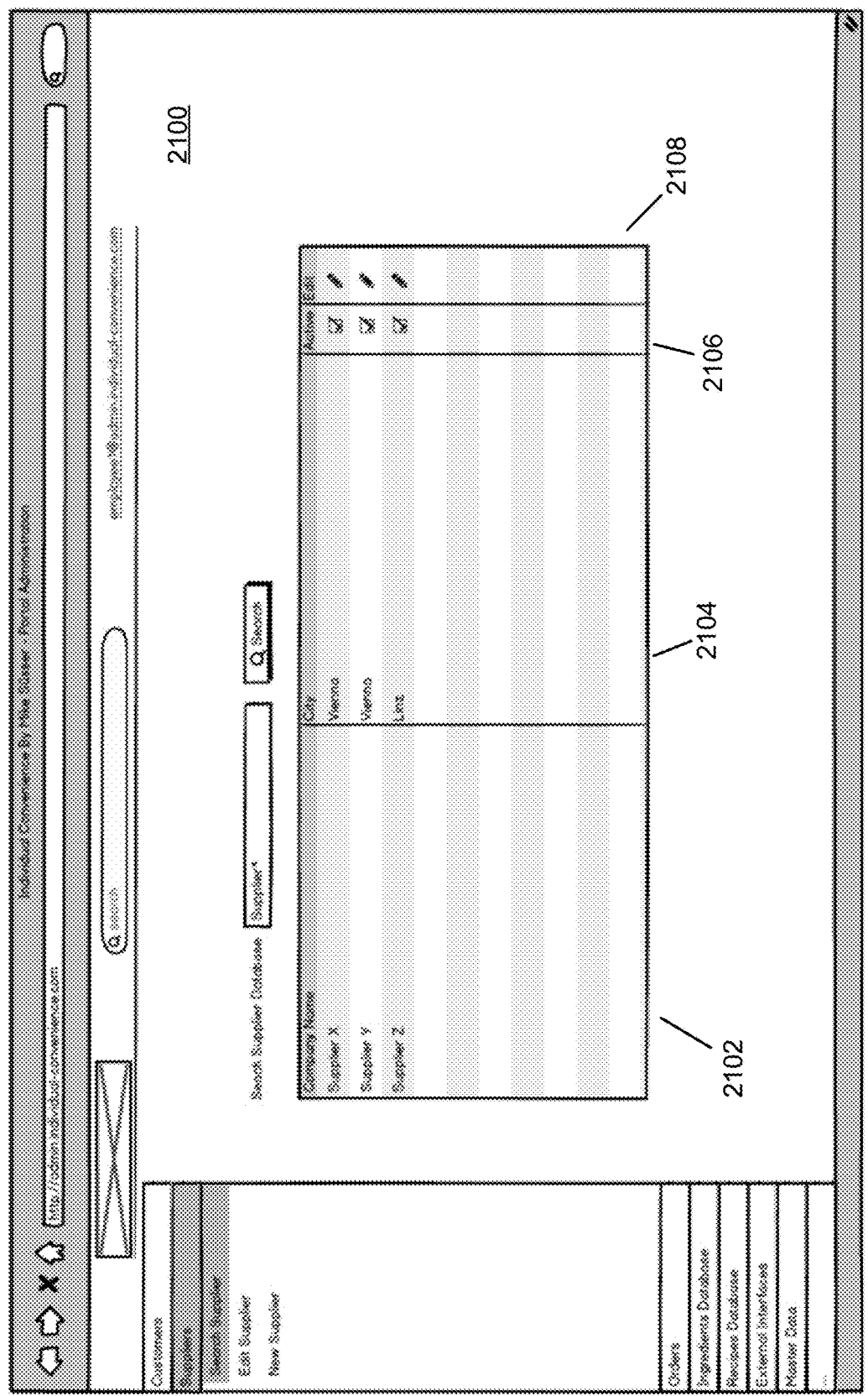
FIG. 21-24 illustrate exemplary supplier interfaces according to an embodiment of the present invention.

FIG. 21 presents an exemplary interface for searching supplier information according to an embodiment of the present invention. An administrator may use supplier search interface 2100 to search a supplier database. Submitting a search may cause search interface 2100 to return entries of each matching supplier and display company name 2102, city 2104, active status 2106, and edit control 2108.

Figure 22:
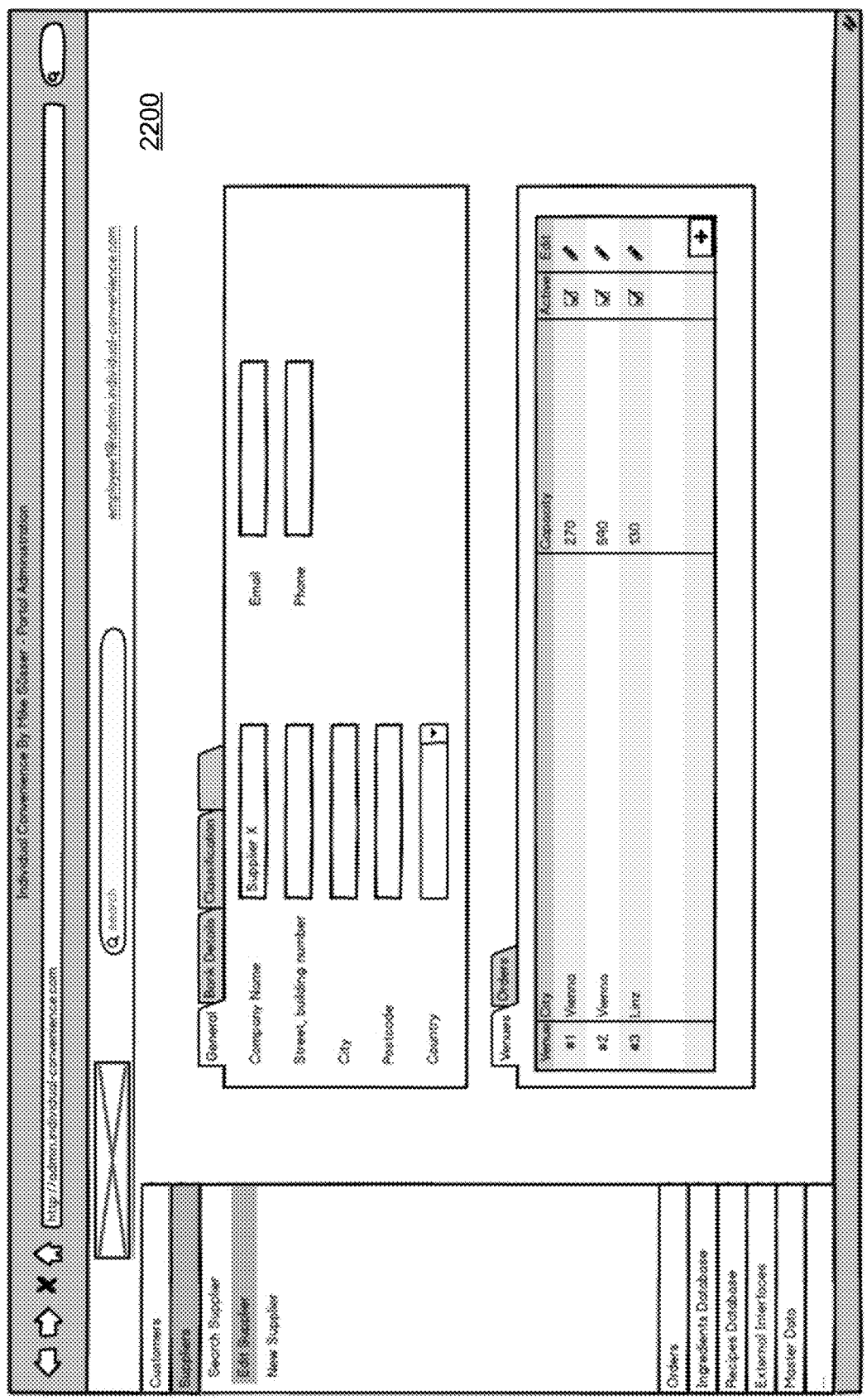
Figure 23:
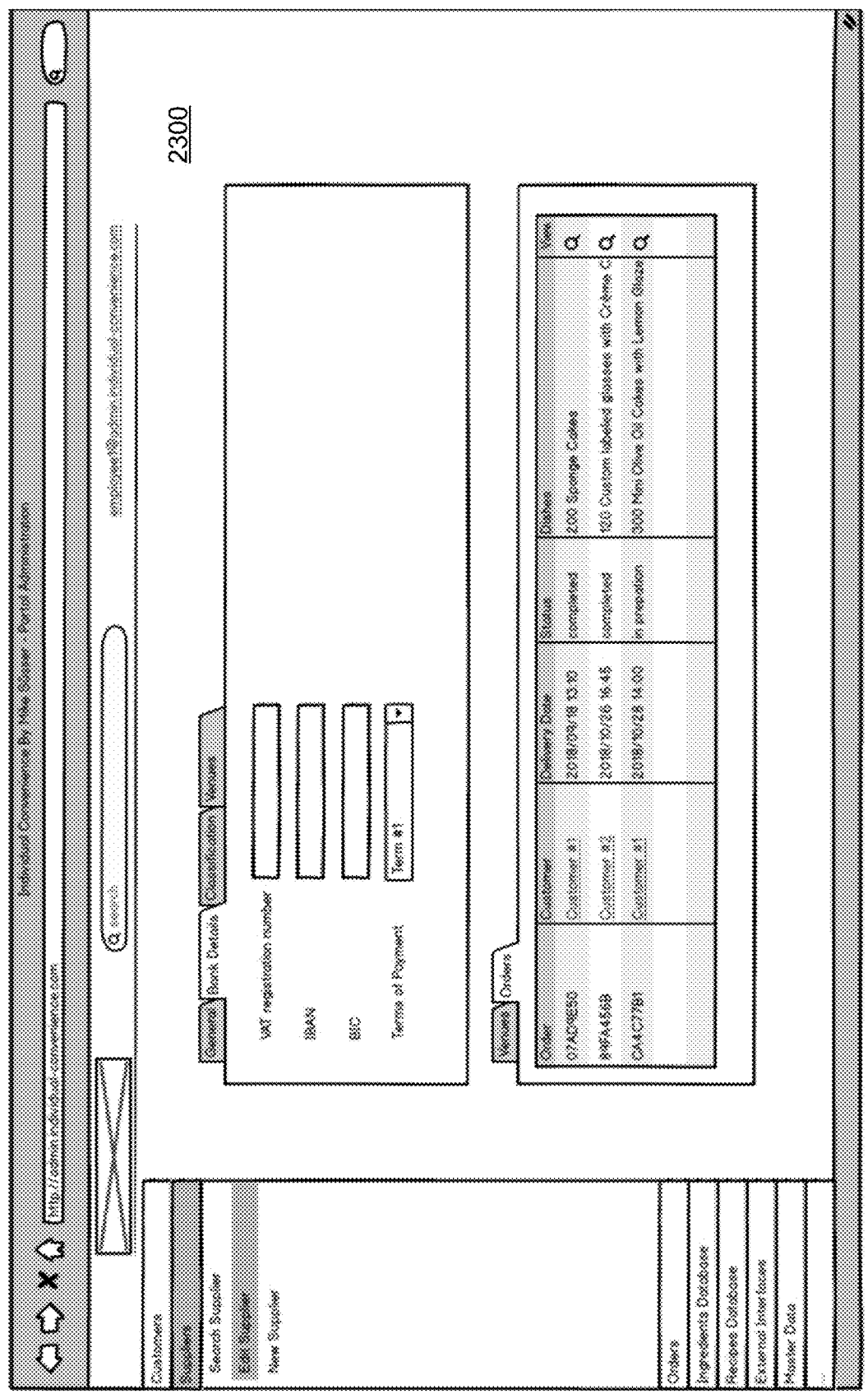
Figure 24:
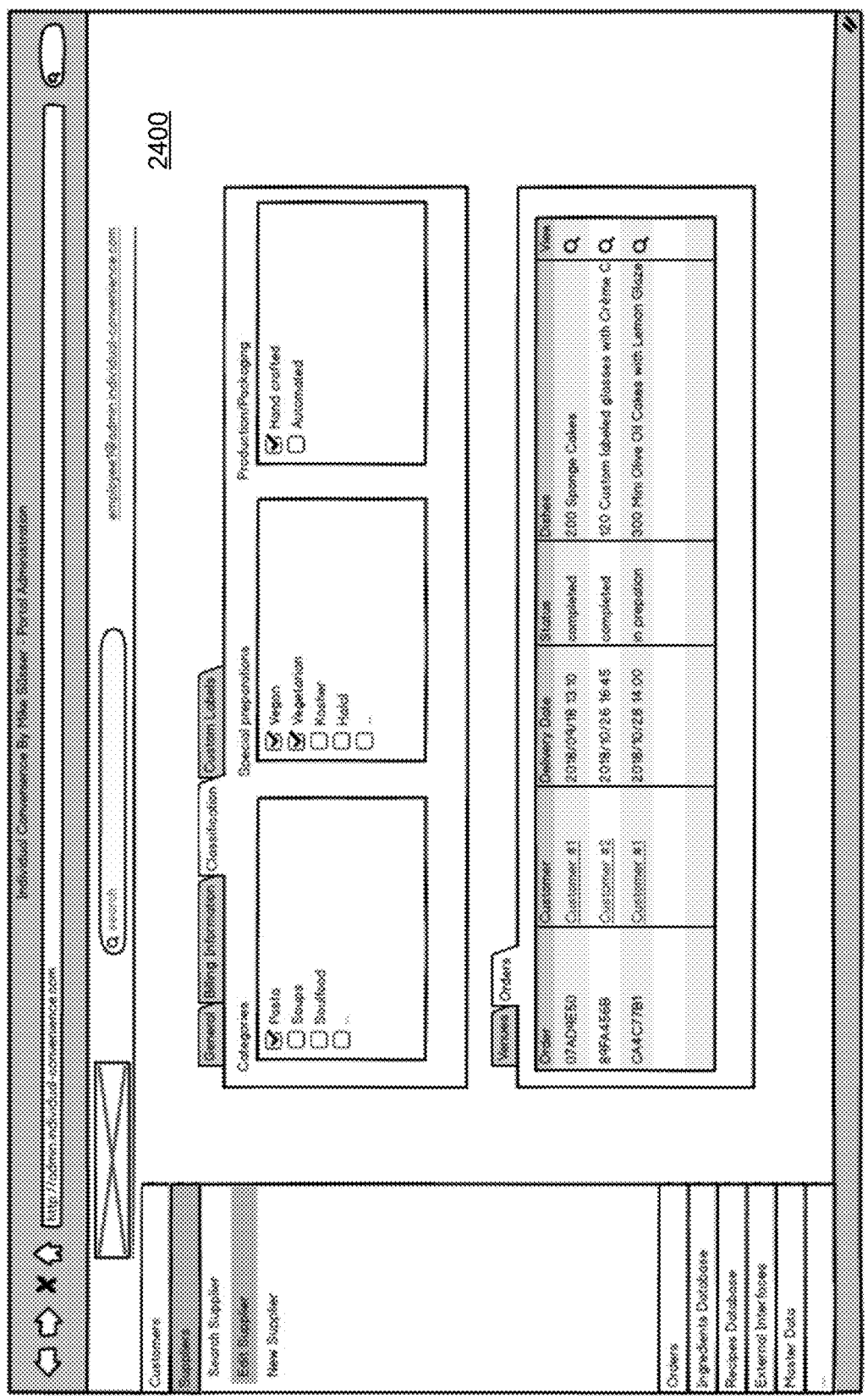

Information of suppliers may be viewed and edited according to interfaces depicted in FIGS. 22-24. FIG. 22 presents an exemplary supplier general information interface 2200 that may be used by the administrator to edit address and contact information. Venue and order information may also be viewed for each supplier. FIG. 23 presents an exemplary supplier bank detail interface 2300. Supplier classification information may be viewed and edited with a classification interface 2400, as illustrated in FIG. 24 according to one embodiment. Classification interface 2400 may be used to view or edit information such as supplier food category, special preparation detail, and production/packaging capabilities.

Figure 25:
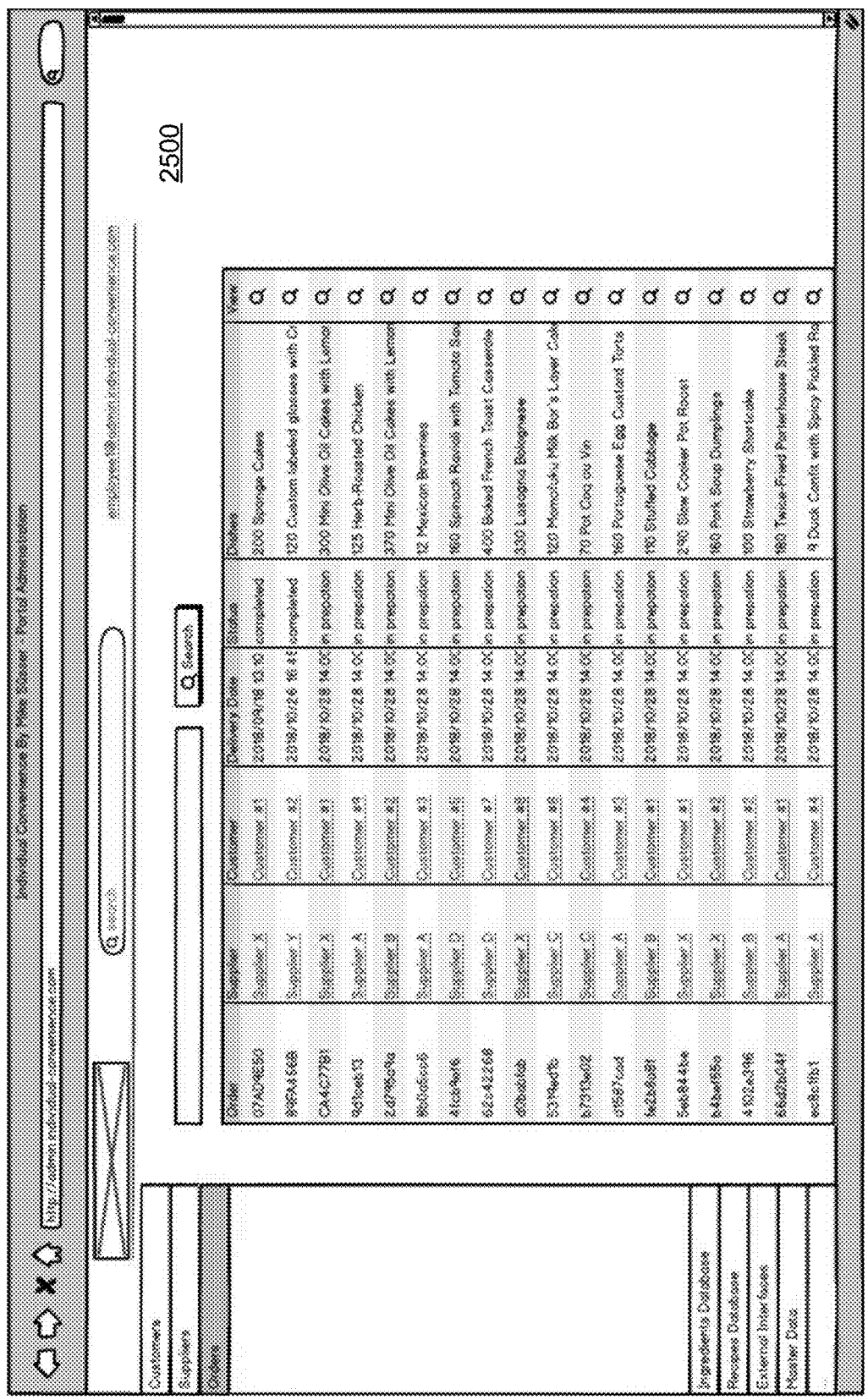
FIG. 25 illustrates an exemplary interface for searching orders according to one embodiment.

FIG. 25 presents an exemplary interface for searching orders according to one embodiment. Order interface 2500 may be used to search for and view details of order entries based on one or more criteria. For example, the order interface 2500 may search for order entries by order identifier, supplier, customer, delivery date, status, and/or dish.

Figure 26:
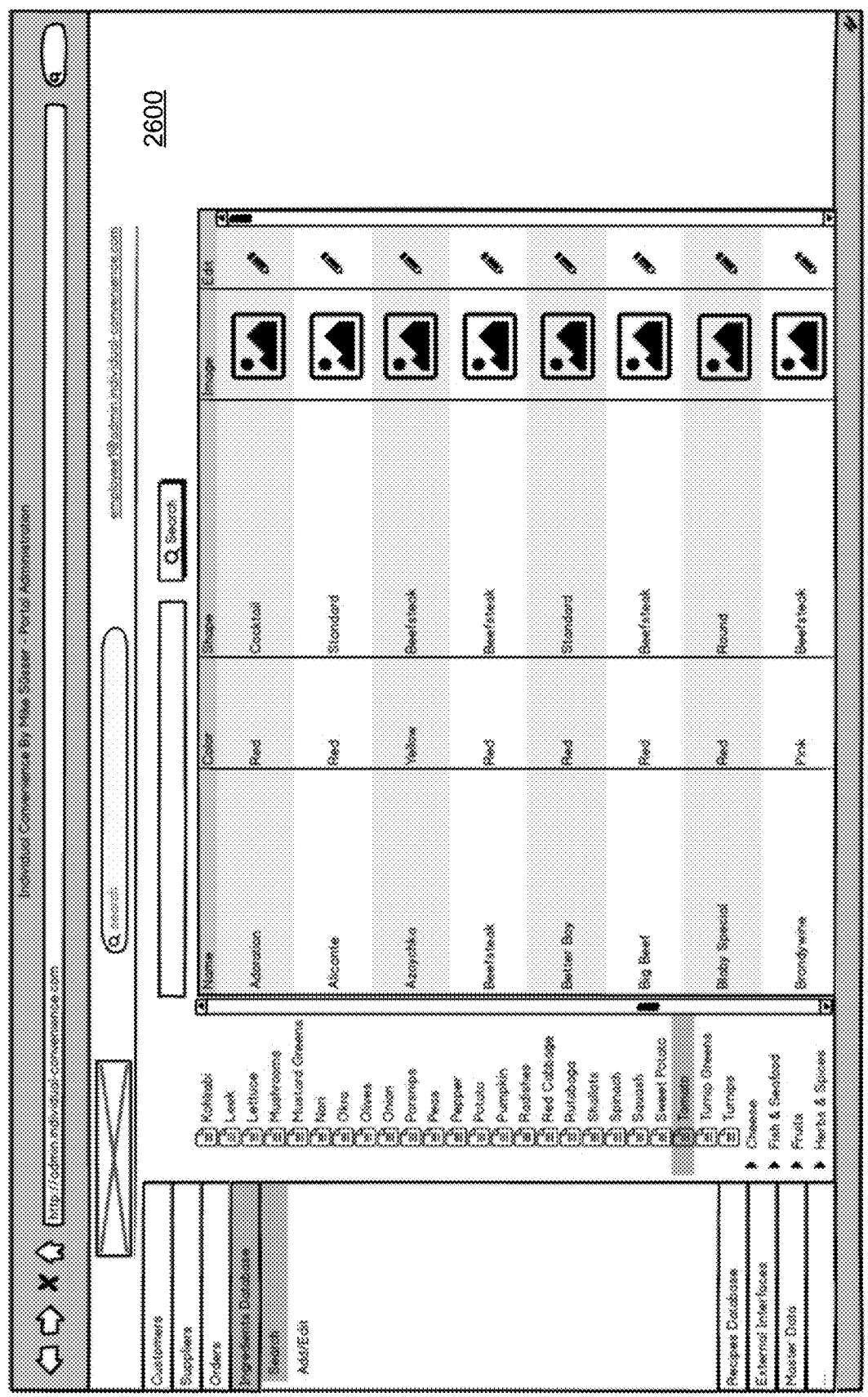
FIG. 26 illustrates an exemplary interface for searching an ingredients database according to one embodiment.
Figure 27:
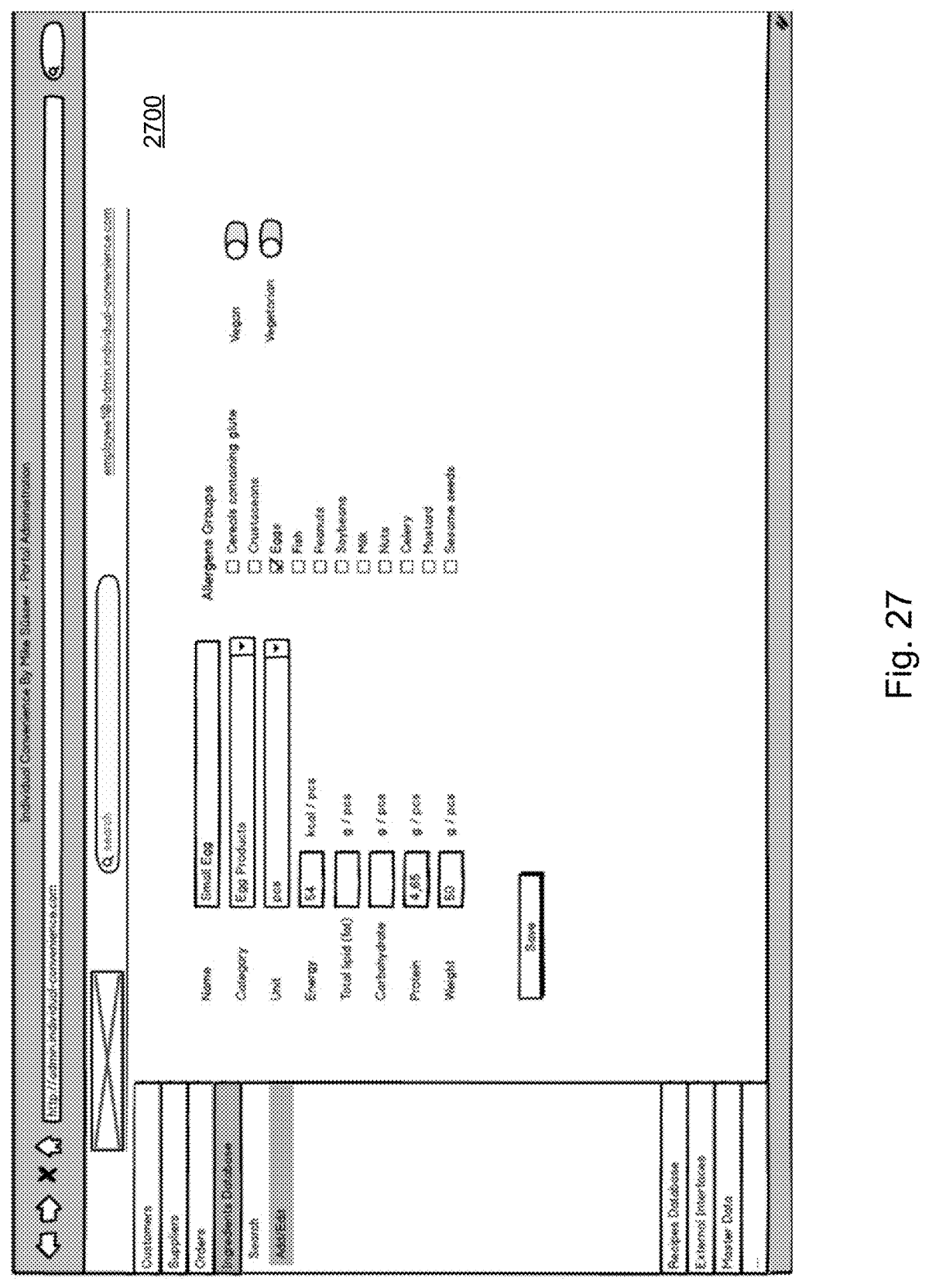

FIG. 26 presents an exemplary interface for searching an ingredients database according to one embodiment. Ingredient search interface 2600 may be used to search for ingredient entries. Ingredient entries may include information, such as name, color, shape, and image. Additionally, ingredient entries may be edited as shown in FIG. 27. FIG. 27 presents an exemplary ingredient entry interface according to an embodiment of the present invention. An ingredient entry page 2700 is depicted having a plurality of information fields that may be viewed and edited. Exemplary information fields may include name, category, unit, energy, total lipid, carbohydrate, protein, weight, allergen group, vegan indication, and vegetarian indication.

FIGS. 1 through 27 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A grocery preparation and fulfillment service management system, the system comprising:
    at least one ingredients database including product data and ingredient availability data that is received from a plurality of fulfillment servers;
    a cloud computing environment including a public cloud space and a private cloud space, the private cloud space comprising a private computing space partitioned from within the cloud computing environment for access limited to an account of a user of a client device, wherein the private cloud space is configured to store private recipe data of the user from the client device;
    a login interface configured to sign in the client device to the private cloud space with the account;
    a search engine configured to receive from the user a search of the product data and retrieve the ingredient availability data from the at least one ingredients database based on the search;
    an ordering interface coupled to the search engine and configured for access with the account by the user of the client device over a communication network, the ordering interface including a website configured to create purchase orders and add the purchase orders to an online shopping cart for the account, wherein the purchase order specifies a set of ingredients and a manner in which the set of ingredients are to be prepared based on ordering data templates corresponding to the private recipe data and the ingredient availability data, and wherein the private recipe data is linked to the product data in the ingredients database and is retrievable by the website from the private computing space;
    a marketplace system configured to receive a request to sell units of purchase orders from the ordering interface to other users, generate a listing based on the request, receive listing orders corresponding to the listing, and forward the listing orders to a fulfillment manager system; and
    the fulfillment manager system in communication with the plurality of fulfillment servers via the communication network, the fulfillment manager system configured to solicit the listing orders to the plurality of fulfillment servers, receive offers from the plurality of fulfillment servers to execute the listing orders, and confirm the offers, wherein the plurality of fulfillment servers are solicited based on an ability of fulfillment centers associated with the plurality of fulfillment servers to fulfill the listing orders, the plurality of fulfillment servers include corresponding inventory management systems that compute the ability of fulfillment centers to fulfill the listing orders based on inventory level data of the fulfillment centers.

2. The system of claim 1 wherein the marketplace system is further configured to generate listings on an online marketplace in coordination with the plurality of fulfillment servers.

3. The system of claim 1 wherein the fulfillment manager system is further configured to distribute the purchase order to the plurality of fulfillment servers based on at least one of location, product availability, and ability to fulfill the purchase order.

4. The system of claim 1 wherein the ordering interface is further configured to generate the purchase order including instructions for packaging, labeling, and shipping of the set of ingredients according to a user's preferences.

5. The system of claim 1 wherein the private computing space is further configured to create the private recipe data based on input from the user of the client device.

6. The system of claim 1 wherein the ordering data templates include data of food ingredients and amounts of the food ingredients for each serving.

7. The system of claim 6 wherein the ordering interface is further configured to create the purchase order by converting a number of servings into the amounts of the food ingredients based on the ordering data templates.

8. The system of claim 6 wherein the private recipe data includes preparation instructions for the food ingredients.

9. The system of claim 8 wherein the preparation instructions include specification of at least one of cutting, seasoning, marinating, mixing, heating, cooling, and packaging of the food ingredients.

10. A method, in a data processing system comprising a processor and a memory, for managing grocery preparation and fulfillment systems, the method comprising:
    signing in, by a server, a client device of a user to a private cloud space of a cloud computing environment with an account, the cloud computing environment including a public cloud space and the private cloud space, the private cloud space comprising a private computing space partitioned from within the cloud computing environment for access limited to the account, wherein the private cloud space is configured to store private recipe data of the user from the client device;

transmitting, by the server, a search of product data from the client device to a search engine;

receiving, by the server from the search engine, ingredient availability data from at least one ingredients database based on the search, the at least one ingredients database including the product data and ingredient availability data that is received from a plurality of fulfillment servers;

configuring, by the server, an ordering interface for access with the account by the user of the client device over a communication network, the ordering interface communicatively coupled to the search engine and including a website configured to create purchase orders and add the purchase orders to an online shopping cart for the account, wherein the purchase order specifies a set of ingredients and a manner in which the set of ingredients are to be prepared based on ordering data templates corresponding to the private recipe data and the ingredient availability data, and wherein the private recipe data is linked to the product data in the ingredients database and is retrievable by the website from the private computing space;

transmitting, by the server, a request to sell units of purchase orders from the ordering interface to a marketplace system, the marketplace system is configured to generate a listing based on the request and receive listing orders corresponding to the listing; and soliciting, by the server, the listing orders to a fulfillment manager system in communication with a plurality of fulfillment servers, the fulfillment manager system configured to receive offers from the plurality of fulfillment servers to execute the listing orders, and confirm the offers, wherein the plurality of fulfillment servers are solicited based on an ability of fulfillment centers associated with the plurality of fulfillment servers to fulfill the listing orders, the plurality of fulfillment servers include corresponding inventory management systems that compute the ability of fulfillment centers to fulfill the listing orders based on inventory level data of the fulfillment centers.

11. The method of claim 10 wherein the purchase order further includes instructions for packaging, labeling, and shipping of the set of ingredients according to a user's preferences.

12. The method of claim 10 wherein the ordering data templates include data of food ingredients and amounts of the food ingredients for each serving.

13. The method of claim 12 further comprising configuring the ordering interface to create the purchase order by converting a number of servings into the amounts of the food ingredients based on the ordering data templates.

14. The method of claim 12 wherein the private recipe data includes preparation instructions for the food ingredients.

15. The method of claim 12 wherein the preparation instructions include specification of at least one of cutting, seasoning, marinating, mixing, heating, cooling, and packaging of the food ingredients.

16. Non-transitory computer-readable media comprising program code that when executed by a programmable processor causes execution of a method for managing grocery preparation and fulfillment systems, the computer-readable media comprising:

computer program code for signing in a client device of a user to a private cloud space of a cloud computing environment with an account, the cloud computing environment including a public cloud space and the private cloud space, the private cloud space comprising a private computing space partitioned from within the cloud computing environment for access limited to the account, wherein the private cloud space is configured to store private recipe data of the user from the client device;

computer program code for transmitting a search of product data from the client device to a search engine;

computer program code for receiving from the search engine ingredient availability data from at least one ingredients database based on the search, the at least one ingredients database including the product data and ingredient availability data that is received from a plurality of fulfillment servers;

computer program code for configuring an ordering interface for access with the account by the user of the client device over a communication network, the ordering interface communicatively coupled to the search engine and including a website configured to create purchase orders and add the purchase orders to an online shopping cart for the account, wherein the purchase order specifies a set of ingredients and a manner in which the set of ingredients are to be prepared based on ordering data templates corresponding to the private recipe data and the ingredient availability data, and wherein the private recipe data is linked to the product data in the ingredients database and is retrievable by the website from the private computing space;

computer program code for transmitting a request to sell units of purchase orders from the ordering interface to a marketplace system, the marketplace system is configured to generate a listing based on the request and receive listing orders corresponding to the listing; and computer program code for soliciting the listing orders to a fulfillment manager system in communication with a plurality of fulfillment servers, the fulfillment manager system configured to receive offers from the plurality of fulfillment servers to execute the listing orders, and confirm the offers, wherein the plurality of fulfillment servers are solicited based on an ability of fulfillment centers associated with the plurality of fulfillment servers to fulfill the listing orders, the plurality of fulfillment servers include corresponding inventory management systems that compute the ability of fulfillment centers to fulfill the listing orders based on inventory level data of the fulfillment centers.

17. The non-transitory computer-readable media of claim 16 wherein the purchase order further includes instructions for packaging, labeling, and shipping of the set of ingredients according to a user's preferences.

18. The non-transitory computer-readable media of claim 16 wherein the ordering data templates include data of food ingredients and amounts of the food ingredients for each serving.

19. The non-transitory computer-readable media of claim 18 further comprising computer program code for configuring the ordering interface to create the purchase order by converting a number of servings into the amounts of the food ingredients based on the ordering data templates.

20. The non-transitory computer-readable media of claim 18 wherein the private recipe data includes preparation instructions for the food ingredients that specific at least one of cutting, seasoning, marinating, mixing, heating, cooling, and packaging of the food ingredients.

\* \* \* \* \*